(12) United States Patent
Lee et al.

(10) Patent No.: US 10,944,120 B2
(45) Date of Patent: Mar. 9, 2021

(54) POLYMER ELECTROLYTE, METHOD OF PREPARING THE POLYMER ELECTROLYTE, AND LITHIUM METAL BATTERY INCLUDING THE SAME

(71) Applicants: Samsung Electronics Co., Ltd., Suwon-si (KR); Samsung SDI Co., Ltd., Yongin-si (KR)

(72) Inventors: Myungjin Lee, Seoul (KR); Seoksoo Lee, Yongin-si (KR); Taehwan Yu, Seongnam-si (KR)

(73) Assignees: SAMSUNG ELECTRONICS CO., LTD., Gyeonggi-do (KR); SAMSUNG SDI CO., LTD., Gyeonggi-do (KR)

( * ) Notice: Subject to any disclaimer, the term of this patent is extended or adjusted under 35 U.S.C. 154(b) by 367 days.

(21) Appl. No.: 15/791,540

(22) Filed: Oct. 24, 2017

(65) Prior Publication Data

US 2018/0115006 A1 Apr. 26, 2018

(30) Foreign Application Priority Data

Oct. 25, 2016 (KR) .................. 10-2016-0139291
Oct. 20, 2017 (KR) .................. 10-2017-0136595

(51) Int. Cl.
*H01M 8/1018* (2016.01)
*C08F 220/20* (2006.01)
(Continued)

(52) U.S. Cl.
CPC ......... *H01M 8/1018* (2013.01); *C08F 220/20* (2013.01); *C08G 65/007* (2013.01);
(Continued)

(58) Field of Classification Search
CPC ........... H01M 8/1018; H01M 10/0525; H01M 10/0565; H01M 10/0585; H01M 4/134;
(Continued)

(56) References Cited

U.S. PATENT DOCUMENTS 4,357,215 A 11/1982 Goodenough et al.
5,347,301 A * 9/1994 Kawanishi ............... G03G 5/02
346/135.1
(Continued)

FOREIGN PATENT DOCUMENTS

CN 102977291 * 3/2013
EP 0351364 * 6/1989
(Continued)

OTHER PUBLICATIONS

CN 102977291 Abstract (Year: 2013).*
(Continued)

*Primary Examiner* — Alexander Usyatinsky
(74) *Attorney, Agent, or Firm* — Cantor Colburn LLP

(57) ABSTRACT

A polymer electrolyte including a copolymer having at least one first repeating unit represented by Formula 1 and at least one second repeating unit represented by Formula 2:

Formula 1

$$\begin{array}{c} R_1 \quad R_2 \\ | \quad | \\ -\!\!\!\!-\!\!\!\!\!\begin{array}{c}C\!\!-\!\!C\end{array}\!\!\!\!\!\!\!\!-\!\!\!\!\!-_m \\ | \quad | \\ O\!\!=\!\!C \quad R_3 \\ | \\ O \\ | \\ L_1 \\ | \\ R_4 \end{array}$$

(Continued)

US 10,944,120 B2

Page 2

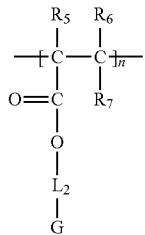

Formula 2 wherein, $R_1$ to $R_4$, $L_1$, and m in Formula 1 and $R_5$ to $R_7$, $L_2$, G and n in Formula 2 are the same as defined in the specification.

16 Claims, 18 Drawing Sheets

(51) Int. Cl.
| | |
|---|---|
| H01M 4/62 | (2006.01) |
| C08J 5/00 | (2006.01) |
| C08G 65/00 | (2006.01) |
| C08G 65/40 | (2006.01) |
| C08G 65/48 | (2006.01) |
| C08J 3/24 | (2006.01) |
| C08K 5/435 | (2006.01) |
| H01M 4/134 | (2010.01) |
| H01M 4/38 | (2006.01) |
| H01M 10/0525 | (2010.01) |
| H01M 10/0565 | (2010.01) |
| H01M 10/0585 | (2010.01) |

(52) U.S. Cl.
CPC .............. *C08G 65/40* (2013.01); *C08G 65/48* (2013.01); *C08J 3/24* (2013.01); *C08J 5/00* (2013.01); *C08K 5/435* (2013.01); *H01M 4/134* (2013.01); *H01M 4/382* (2013.01); *H01M 4/623* (2013.01); *H01M 10/0525* (2013.01); *H01M 10/0565* (2013.01); *H01M 10/0585* (2013.01); *H01M 2300/0082* (2013.01)

(58) Field of Classification Search
CPC ........ H01M 4/38; H01M 4/382; H01M 4/623; H01M 2300/0082; C08G 65/00; C08G 65/40; C08G 65/48; C08G 65/007; C08J 3/24; C08J 5/00; C08K 5/435; C08F 220/20
See application file for complete search history.

(56) References Cited

U.S. PATENT DOCUMENTS

| | | | | |
|---|---|---|---|---|
| 5,633,098 | A | * | 5/1997 | Narang .................. H01G 9/022 429/104 |
| 5,998,559 | A | * | 12/1999 | Narang .................. H01B 1/122 528/14 |
| 6,509,122 | B1 | * | 1/2003 | Oyama ............... C08F 290/062 429/303 |
| 7,026,071 | B2 | | 4/2006 | Mayes et al. |
| 7,513,136 | B2 | | 4/2009 | Laliberte et al. |
| 7,531,012 | B2 | | 5/2009 | Sudano et al. |
| 7,547,492 | B2 | | 6/2009 | Awano et al. |
| 7,968,224 | B2 | | 6/2011 | Sudano et al. |
| 8,445,140 | B2 | | 5/2013 | Bertin et al. |
| 8,563,168 | B2 | | 10/2013 | Balsara et al. |
| 9,540,312 | B2 | * | 1/2017 | Teran ..................... C07C 69/96 |
| 2004/0023121 | A1 | | 2/2004 | Nakamura et al. |
| 2009/0263725 | A1 | | 10/2009 | Balsara et al. |
| 2011/0206994 | A1 | | 8/2011 | Balsara et al. |
| 2011/0281173 | A1 | | 11/2011 | Singh et al. |
| 2013/0197628 | A1 | * | 8/2013 | Barcikowski ......... C08F 212/24 623/1.49 |
| 2013/0236764 | A1 | | 9/2013 | Hu et al. |
| 2014/0364567 | A1 | | 12/2014 | Balsara et al. |
| 2015/0197585 | A1 | | 7/2015 | Epps, III et al. |
| 2016/0013515 | A1 | | 1/2016 | Lee et al. |
| 2016/0028114 | A1 | | 1/2016 | Pratt et al. |
| 2016/0064770 | A1 | | 3/2016 | Lee et al. |
| 2016/0064772 | A1 | | 3/2016 | Choi et al. |
| 2016/0064773 | A1 | | 3/2016 | Choi et al. |
| 2016/0072148 | A1 | | 3/2016 | Lee et al. |
| 2016/0087306 | A1 | | 3/2016 | Lee et al. |
| 2016/0093916 | A1 | | 3/2016 | Moon et al. |
| 2016/0294005 | A1 | | 10/2016 | Lee et al. |
| 2016/0329567 | A1 | | 11/2016 | Lee et al. |
| 2016/0336618 | A1 | | 11/2016 | Lee et al. |
| 2016/0351956 | A1 | | 12/2016 | Lee et al. |
| 2017/0062829 | A1 | | 3/2017 | Ryu et al. |
| 2017/0309917 | A1 | | 10/2017 | Lee et al. |
| 2017/0317352 | A1 | | 11/2017 | Lee et al. |
| 2017/0324097 | A1 | | 11/2017 | Lee et al. |
| 2017/0346099 | A1 | | 11/2017 | Choi et al. |
| 2017/0373347 | A1 | | 12/2017 | Lee et al. |

FOREIGN PATENT DOCUMENTS

| | | |
|---|---|---|
| EP | 0351364 A2 | 6/1989 |
| EP | 3261165 A1 | 12/2017 |
| KR | 10-2009-0015036 A | 2/2009 |
| KR | 10-2016-0008369 A | 1/2016 |
| KR | 10-2016-0050222 A | 5/2016 |
| KR | 10-2017-0119904 A | 10/2017 |
| KR | 10-2017-0124075 A | 11/2017 |
| KR | 10-2017-0126404 A | 11/2017 |
| KR | 10-2017-0134036 A | 12/2017 |
| KR | 10-2018-0000942 A | 1/2018 |
| WO | 2009-146340 A1 | 12/2009 |
| WO | 2010-083325 A1 | 7/2010 |
| WO | 2010-083330 A1 | 7/2010 |

OTHER PUBLICATIONS

Extended European Search Report issued by the European Patent Office dated Mar. 5, 2018 for European Patent Application No. 17197955.2-1108.
Patrick E. Trapa et al. "Rubbery Graft Copolymer Electrolytes for Solid-State, Thin-Film Lithium Batteries", Journal of the Electrochemical Society, 152 (1) A1-A5 (2005).
Office action issued by the European Patent Office dated Sep. 11, 2019 in the examination of the European Patent Application No. 17197955.2, which corresponds to the U.S. Application above.
Richard S. Baldwin, et al., Battery Separator Characterization and Evaluation Procedures for NASA's Advanced Lithium-Ion Batteries, https://ntrs.nasa.gov/search.jsp?R=20100021170 2019-10-03T13:55:29+00:00Z, XP055608344, 70 pages.
Thermal Analaysis of Polymers Application Handbook, Selected Applications, Jan. 2013, 40 pages.
Thomas Dent, Applications Scientist; Agilent Technologies; Oct. 2011; Gulf Coast Conference; GPC/SEC Practical Tips and Tricks, XP055608606, 38 pages.

\* cited by examiner

POLYMER ELECTROLYTE, METHOD OF PREPARING THE POLYMER ELECTROLYTE, AND LITHIUM METAL BATTERY INCLUDING THE SAME

CROSS-REFERENCE TO RELATED APPLICATION

This application claims priority to Korean Patent Application No. 10-2016-0139291, filed on Oct. 25, 2016 and Korean Patent Application No. 10-2017-0136595, filed on Oct. 20, 2017 in the Korean Intellectual Property Office, and all the benefits accruing therefrom under 35 U.S.C. § 119, the contents of which are incorporated herein in their entireties by reference.

BACKGROUND

1. Field

The present disclosure relates to a polymer electrolyte, a method of preparing the polymer electrolyte, and a lithium metal battery including the polymer electrolyte.

2. Description of the Related Art

Lithium secondary batteries are high-performance batteries having the highest energy density among currently available secondary batteries, and have various applications such as in electric vehicles.

A lithium secondary battery may use a lithium metal thin film as a negative electrode. When a lithium metal thin film is used as the negative electrode, the negative electrode may readily react with a liquid electrolyte during charging or discharging due to the high reactivity of lithium, or dendritic growth may result on the negative electrode so as to cause short circuit. Accordingly, a lithium secondary battery including such a lithium metal thin film may have a reduced lifespan and reduced stability. Therefore, there is a need for a stable lithium battery having improved functional characteristics. The present application is believed to be an answer to that need.

SUMMARY

Provided are a polymer electrolyte having improved high-voltage stability, and a method of preparing the polymer electrolyte.

Provided is a lithium metal battery including the polymer electrolyte.

Additional aspects will be set forth in part in the description which follows and, in part, will be apparent from the description, or may be learned by practice of the presented embodiments. According to an aspect of an embodiment, a polymer electrolyte comprising a copolymer that includes:

at least one first repeating unit represented by Formula 1; and at least one second repeating unit represented by Formula 2:

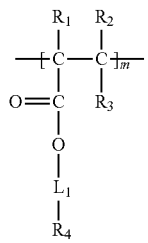

Formula 1 wherein, in Formula 1, $R_1$ to $R_3$ are each independently hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, or a substituted or unsubstituted C2-C30 heterocyclicalkyl group, $R_4$ is hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C7-C30 arylalkyl group, a substituted or unsubstituted C2-C30 heteroaryl group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, —Si(R)(R') (R"), or a substituted or unsubstituted C2-C30 heterocyclicalkyl group, R, R', and R" are each independently hydrogen or a C1-C10 alkyl group, $L_1$ is an ion-conductive unit selected from a C1-C30 alkylene oxide group, —{Si(R)(R')—O—}$_b$—, —(CH$_2$CH$_2$O)$_a$—{Si(R)(R')—O—}$_b$—, and —(CH$_2$)$_a$—(Si(R)(R')—O—)$_b$, R, R', and R" are each independently hydrogen or a C1-C10 alkyl group, a is an integer from 1 to 20, b is an integer from 1 to 60, and 0<m<1,

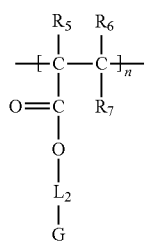

Formula 2 wherein, in Formula 2, $R_5$ to $R_7$ are each independently hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, or a substituted or unsubstituted C2-C30 heterocyclicalkyl group, $L_2$ is a linker selected from a C1-C12 alkylene group, a C2-C12 alkenylene group, a C2-C12 alkynylene group, and a C6-C12 arylene group, 0<n<1, and G is a carbonate-containing functional group or a fluorine-containing functional group, and each of m and n respectively denotes a mole fraction of the at least one first repeating unit and the at least one second repeating unit, wherein the sum of m and n is 1.

According to an aspect of another embodiment, a lithium metal battery includes:

a positive electrode;

a negative electrode comprising a lithium metal or a lithium metal alloy; and the polymer electrolyte disposed between the positive electrode and the negative electrode.

BRIEF DESCRIPTION OF THE DRAWINGS

These and/or other aspects will become apparent and more readily appreciated from the following description of the embodiments, taken in conjunction with the accompanying drawings in which:

FIG. 4 is a diagram illustrating the results of ion conductivity analysis (σ, millisiemens per centimeter, ms/cm) of polymer electrolytes prepared in Examples 1a, 1b, 2a, 2b, 3a, 3b, and 4 to 6, and Comparative Examples 1 and 2a;

FIG. 5C is a graph illustrating lifespan characteristics of Li/Li symmetric cells using the polymer electrolytes prepared in Comparative Examples 1 and 2a;

FIG. 8A is a graph of absorbance (arbitrary units, a.u.) versus wavenumber (reverse centimeters, $cm^{-1}$) illustrating the results of IR analysis of copolymers prepared in Examples 1A, 2A, and 3A, and Comparative Examples 1 and 2a;

FIG. 8B is a graph of intensity (arbitrary units, a.u.) versus chemical shift (parts per million, ppm) illustrating the results of $^1$H-NMR spectrum analysis of the polymer electrolytes prepared in Examples 1a, 2a, and 3a, and Comparative Examples 1 and 2a;

FIG. 9 is a graph of current density with respect to voltage (volts, v) of lithium metal batteries using the polymer electrolytes prepared in Examples 1a, 2a, and 3a, and Comparative Examples 1 and 2a; and FIG. 10 is a diagram illustrating the results of lithium transfer constant ($t_{Li}$) measurements of lithium symmetric cells using the polymer electrolytes prepared in Examples 1a, 2a, 3a, and 4, and Comparative Examples 1 and 2a.

DETAILED DESCRIPTION

Figure 1:
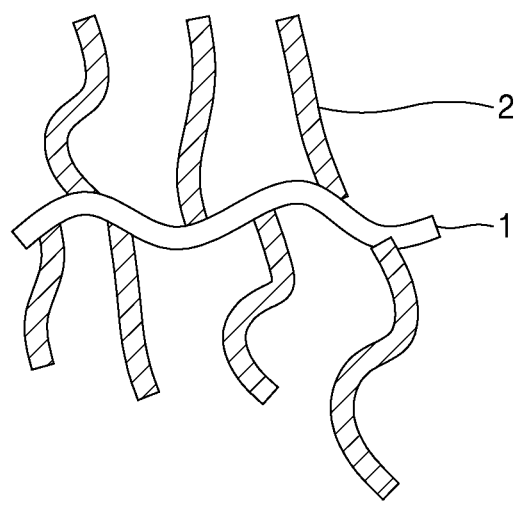
FIG. 1 is a schematic view illustrating a structure of a copolymer forming a polymer electrolyte according to an embodiment.

Reference will now be made in detail to embodiments of a polymer electrolyte, a method of preparing the polymer electrolyte, and a lithium metal battery including the polymer electrolyte, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present disclosure. As used herein, the term "and/or" includes any and all combinations of one or more of the associated listed items. Expressions such as "at least one of," when preceding a list of elements, modify the entire list of elements and do not modify the individual elements of the list.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

It will be understood that, although the terms first, second, third, etc., may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an," and "the" are intended to include the plural forms as well, unless the context clearly indicates otherwise.

The term "or" means "and/or." As used herein, the terms such as "comprising", "including", "having", or the like are intended to indicate the existence of the features regions, integers, steps, operations, components, and/or elements disclosed in the specification, and are not intended to preclude the possibility that one or more other features or elements may exist or may be added.

It will also be understood that when an element such as a layer, a region or a component is referred to as being "on" another layer or element, it can be directly on the other layer or element, or intervening layers, regions, or components may also be present. In contrast, when an element is referred to as being "directly on" another element, there are no intervening elements present.

In the drawings, the sizes of elements are exaggerated or reduced for ease of description. The size or thickness of each element shown in the drawings are arbitrarily illustrated for better understanding or ease of description, and thus the present disclosure is not limited thereto.

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

According to an aspect of the present disclosure, a polymer electrolyte includes a copolymer including at least one first repeating unit represented by Formula 1; and at least one second repeating unit represented by Formula 2:

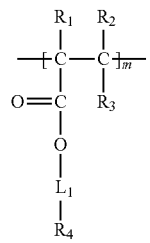

Formula 1

In Formula 1, $R_1$ to $R_3$ may each independently be hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, or a substituted or unsubstituted C2-C30 heterocyclicalkyl group, $R_4$ may be hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C7-C30 arylalkyl group, a substituted or unsubstituted C2-C30 heteroaryl group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, —Si(R)(R')(R"), or a substituted or unsubstituted C2-C30 heterocyclicalkyl group, R, R', and R" may each independently be hydrogen or a C1-C10 alkyl group, $L_1$ may be an ion-conductive unit selected from a C1-C30 alkylene oxide group, —{Si(R)(R')—O—}$_b$—, —(CH$_2$CH$_2$O)$_a$—{Si(R)(R')—O—}$_b$—, and —(CH$_2$)$_a$—(Si(R)(R')—O—)$_b$, R, R', and R" are each independently hydrogen or a C1-C10 alkyl group, a is an integer from 1 to 20, b is an integer from 1 to 60, and 0<m<1.

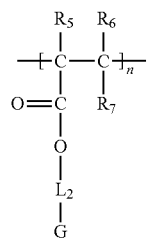

Formula 2

In Formula 2, $R_5$ to $R_7$ may each independently be hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, or a substituted or unsubstituted C2-C30 heterocyclicalkyl group, $L_2$ may be a linker selected from a C1-C12 alkylene group, a C2-C12 alkenylene group, a C2-C12 alkynylene group, and a C6-C12 arylene group, $0<n<1$, G may be a carbonate-containing functional group or a fluorine-containing functional group, and m and n may each denote a mole fraction of the at least one first repeating unit and the at least one second repeating unit, and the sum of m and n may be 1.

In Formula 1, m may be in a range of about 0.01 to about 0.99, or, for example, about 0.6 to about 0.8, and, in Formula 2, n may be in a range of about 0.01 to about 0.99, or, for example, about 0.2 to about 0.4.

A number of carbon atoms in the fluorine-containing functional group may be from 5 to 15, or, for example, from 8 to 12. While not wishing to be bound by theory, it is understood that when the number of carbon atoms in the fluorine-containing functional group is within this range, high-voltage stability may be excellent, a mixing property of the at least one second repeating unit, which includes the fluorine-containing functional group, and the at least one first repeating unit is excellent, and thus solubility characteristics of the copolymer in an organic solvent may be excellent.

In Formula 2, $L_2$ may be a C2-C10 linker.

A degree of polymerization in the copolymer including the at least one first repeating unit represented by Formula 1 and the at least one second repeating unit represented by Formula 2 may be in a range of 10 to 500, or for example, 15 to 300, and a weight average molecular weight may be in a range of 20,000 to 300,000 Daltons (Da). While not wishing to be bound by theory, it is understood that when the degree of polymerization and the weight average molecular weight are within these ranges, high-voltage stability and ion conductivity characteristics of the polymer electrolyte may be excellent without deterioration of mechanical characteristics.

The weight average molecular weight is measured by Gel Permeation Chromatography (GPC), where the GPC system has been appropriately calibrated. The molecular weights were peak molecular weights determined by gel permeation chromatography as polystyrene equivalent molecular weight.

A lithium electrode having a high electric capacity per unit weight may be used to implement a high-capacity battery. The lithium electrode may be a lithium metal or a lithium metal alloy thin film. However, dendritic growth on the lithium electrode during deposition and dissolution of lithium ions may cause a short circuit between the positive electrode and the negative electrode. Further, due to high reactivity towards an electrolyte, the lithium electrode may cause a side reaction with the electrolyte, which consequently may lower a cycle lifespan of the battery. To eliminate this drawback, there is a need for an electrolyte that may protect a surface of the lithium metal or lithium metal alloy thin film.

A polymer electrolyte according to any of the embodiments may serve as a protective layer of a lithium electrode. The polymer electrolyte may function as a protective layer of a lithium electrode of a lithium air battery or a lithium sulfur battery.

Further, a high-voltage positive electrode is used in a lithium metal battery to increase energy density. Thus, when the lithium metal battery is operated at a high voltage, there is a need for a polymer electrolyte with improved stability.

A polyethylene oxide-based electrolyte or poly(ethylene glycol) methyl ether acrylate (POEM) may be used as a polymer electrolyte. Since an oxidation decomposition potential of the electrolyte may be as low as 3.8 volts (V), when a 4 V-level oxide-based positive electrode is applied, the electrolyte may easily decompose, and thus may not have good electrochemical stability. Therefore, a lithium metal battery including the polymer electrolyte may have decreased charge/discharge efficiency, and as cell resistance thereof increases, a lifespan of the lithium metal battery may decrease.

In this regard, the present inventors have provided a polymer electrolyte having a high oxidation decomposition potential value with improved high-voltage stability as well as excellent ion conductivity and mechanical characteristics to resolve the aforementioned problems. The polymer electrolyte includes a copolymer including at least one first repeating unit that contains an ion-conductive unit ($L_1$), and at least one second repeating unit that contains a carbonate-containing functional group or a fluorine-containing functional group, which is a unit G having excellent high voltage stability, and a mechanical strength-related unit ($L_2$). The mechanical strength-related unit ($L_2$) is believed to be highly related to miscibility with the at least one first repeating unit. Therefore, when the mechanical strength-related unit ($L_2$) is not used, the miscibility of the at least one first repeating unit with the at least one second repeating unit may not reach the desired level, and thus solubility characteristics of a copolymer including the at least one first repeating unit and the at least one second repeating unit in an organic solvent may not be satisfactory, which thus may result in difficulty in preparation of the polymer electrolyte.

The ion-conductive unit and the unit having excellent high-voltage stability may exist on a side chain of the copolymer as shown in Formulae 1 and 2.

The at least one first repeating unit controls a glass transition temperature of the copolymer to as low as −30° C. or lower, where the copolymer has a rubber-phase structure in this region, and the at least one second repeating unit is a region that contributes to implementing a high oxidation potential value. While not wishing to be bound by theory, it is understood that when the polymer electrolyte including the copolymer including the at least one first repeating unit with these characteristics is used, adhesive strength of the polymer electrolyte with respect to an electrode is enhanced, and thus interfacial resistance between the electrolyte and the electrode decreases.

When —C(=O)— or —C(=O)O— (an ester group) is introduced to each of the at least one first repeating unit and the at least one second repeating unit that constitute the copolymer, conductivity may increase through lithium salt dissociation improvement. Also, while not wishing to be bound by theory, it is understood that when an electron acceptor group such as a carbonate- or a fluorine-containing functional group of the at least one second repeating unit is introduced, a polyethylene oxide chain of the at least one first repeating unit or a polyethylene chain of the at least one first repeating unit may be further stabilized according to a kind of $L_1$.

The copolymer according to any of the embodiments contains an ion-conductive unit 1 and a high-voltage stability unit 2 as shown in FIG. 1.

The copolymer includes at least one first repeating unit and at least one second repeating unit. The copolymer may be, for example, a two-membered copolymer, a three-membered copolymer, or a four-membered copolymer.

The polymer electrolyte may be, for example, a two-membered copolymer including at least one first repeating unit and at least one second repeating unit, a three-membered copolymer including two of the at least one first repeating units and one of the at least one second repeating unit, or a three-membered copolymer including one of the at least one first repeating units and two of the at least one second repeating units.

The copolymer constituting the polymer electrolyte may include all of a random copolymer, an alternating copolymer, a graft copolymer, and a crosslinked copolymer.

G may be at least one selected from groups represented by Formula 2a.

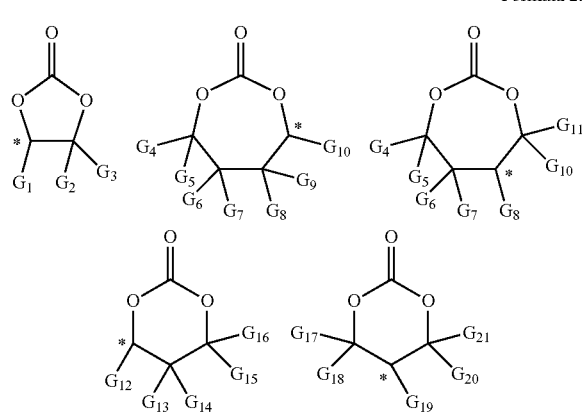

Formula 2a

In Formula 2a, $G_1$ to $G_{21}$ are each independently hydrogen, a C1-C30 alkyl group, a C1-C30 alkoxy group, a C2-C30 alkenyl group, a C2-C30 alkynyl group, a C6-C30 aryl group, a C6-C30 aryloxy group, a C7-C30 arylalkyl group, a C2-C30 heteroaryl group, a C2-C30 heteroaryloxy group, a C3-C30 heteroarylalkyl group, a C4-C30 carbocyclic group, a C5-C30 carbocyclicalkyl group, or a C2-C30 heterocyclic group.

G may be at least one selected from functional groups represented by Formula 2b.

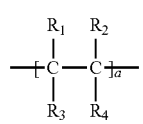

Formula 2b

In Formula 2b, $R_1$ to $R_4$ are each independently a perfluorinated C1-C10 alkyl group, and a is an integer from 1 to 12.

In Formula 2, $L_2$ is a C1-C10 alkylene group. While not wishing to be bound by theory, it is understood that when $L_2$ is a C1-10 alkylene group, mechanical characteristics including flexibility of the polymer electrolyte are excellent. Therefore, the polymer electrolyte may be easily prepared.

In Formula 1, —C(=O)—O-$L_1$-$R_4$ may be one selected from groups represented by Formulae 1a and 1b.

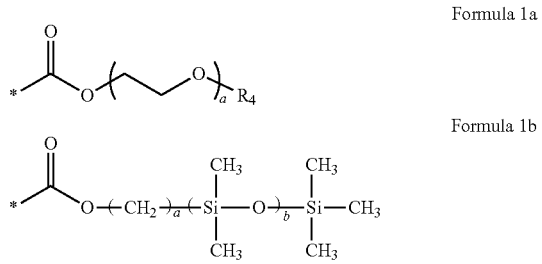

Formula 1a

Formula 1b

In Formulae 1a and 1b, a is an integer from 1 to 12, b is an integer from 1 to 59, and

* is a binding site.

In Formula 2, $L_2$ in —C(=O)—O-$L_2$-G has a significant influence on characteristics including solubility of the copolymer with respect to an organic solvent. As described above, $L_2$ is selected from an alkylene group, an alkenylene group, an alkynylene group, and an arylene group, or, for example, a C1-C12 alkylene group. While not wishing to be bound by theory, it is understood that when $L_2$ is a siloxane-containing functional group, a physical property may be weakened and solubility in an organic solvent may decrease due to the low $T_g$, and thus preparation characteristics of a polymer membrane degrades. In this regard, mechanical characteristics such as flexibility of the polymer electrolyte including the copolymer deteriorate.

—C(=O)—O-$L_2$-G of Formula 2 may be a group represented by one of Formulae 2a-1 to 2a-3.

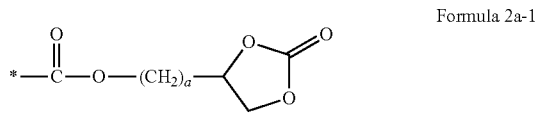

Formula 2a-1

In Formula 2a-1, a is an integer from 1 to 20, or, for example, an integer from 2 to 8.

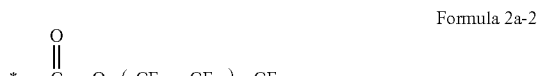

Formula 2a-2

In Formula 2a-2, a is an integer from 1 to 20, or, for example, an integer from 2 to 8.

Formula 2a-3

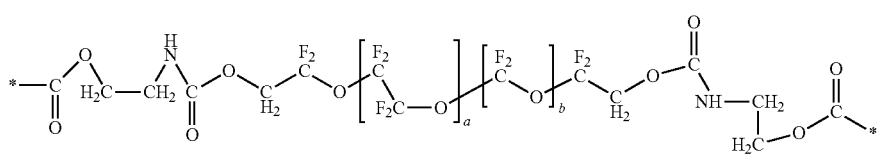

In Formula 2a-3, a and b may each independently be an integer from 1 to 20, or, for example, an integer from 2 to 8, and * in Formulae 2a-1 to 2a-3 is a binding site.

Formula 2a-3 may be a moiety represented by the following formula.

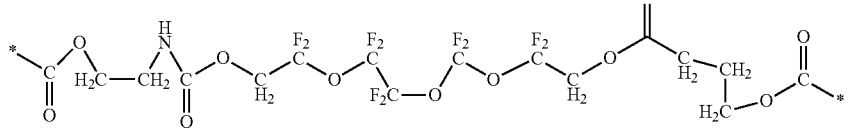

The copolymer according to one of the embodiments may be one selected from a polymer represented by one of formulae 3 to 6; and a copolymerization product of a monofunctional fluoromethacrylate represented by Formula 8a and a compound of Formula 8b, and a degree of polymerization of the polymer of one of Formulae 3 to 6 may be in a range of 15 to 200, and a weight average molecular weight of the polymer of one of Formulae 3 to 6 may be in a range of 20,000 to 300,000 Da.

Formula 3

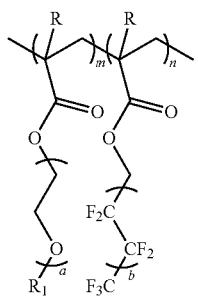

In Formula 3,
R and $R_1$ are each independently hydrogen or a C1-C5 alkyl group,
a is an integer from 1 to 20, and
m and n are each independently a number from 0.01 to 0.99, m+n=1, Formula 4

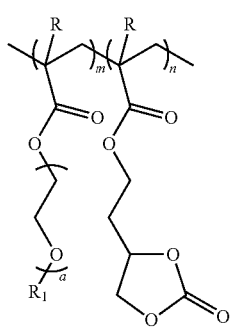

In Formula 4,
R and $R_1$ are each independently hydrogen or a C1-C5 alkyl group,
a is an integer from 1 to 20, and
m and n are each independently a number from 0.01 to 0.99, m+n=1, Formula 5

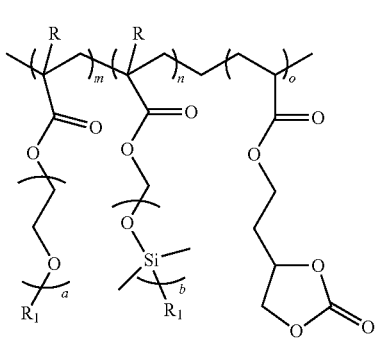

In Formula 5,
R and $R_1$ are each independently hydrogen or a C1-C5 alkyl group,
a is an integer from 1 to 20,
b is an integer from 1 to 60,
m, n, and o are each independently a number from 0.01 to 0.99, m+n+o=1, and Formula 6

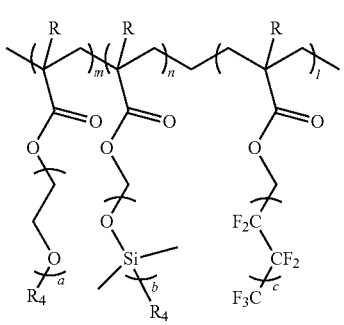

In Formula 6,

R and $R_4$ are each independently hydrogen or a C1-C5 alkyl group, a and c are each independently an integer from 1 to 20, b is an integer from 1 to 60, and m, n, and l are each independently a number from 0.01 to 0.99, m+n+l=1,

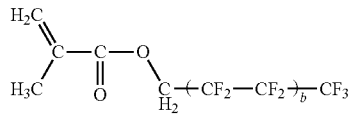

Formula 8a

In Formula 8a, b is an integer from 1 to 20,

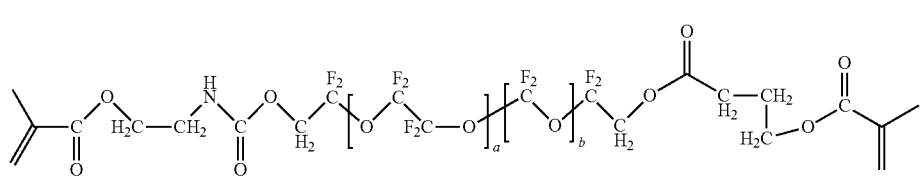

Formula 8b

In Formula 8b, a and b are each independently an integer from 1 to 20.

In Formulae 3 to 5, $R_1$ is a C1-C5 alkyl group, and, in Formula 6, $R_4$ is a C1-C5 alkyl group.

In Formulae 3 to 6, m is, for example, a number from 0.6 to 0.8, and n is, for example, a number from 0.2 to 0.4. A mixing ratio of the at least one first repeating unit to the at least one second repeating unit may be in a range of 6:4 to 8:2, or, for example, 8:2, 6:4, or 7:3.

In Formulae 5 and 6, amounts of the repeating unit denoted by m, the repeating unit denoted by n, and the repeating unit denoted by o or l may be in ranges of 0.4 moles (mol) to 0.9 mol, 0.05 mol to 0.3 mol, and 0.05 mol to 0.3 mol, respectively, based on 1 mol of the total amount of the repeating unit denoted by m, the repeating unit by n, and the repeating unit by o or l, respectively.

The copolymer according to an embodiment may be, for example, one selected from a copolymer represented by Formula 3a; a copolymer including a copolymerization product of a monofunctional fluoromethacrylate represented by Formula 8a and a compound of Formula 8b; a copolymer represented by Formula 11; a copolymer represented by Formula 4a; and a copolymer represented by Formula 5a.

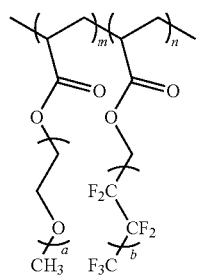

Formula 3a

In Formula 3a, a is 10, b is 8, m and n are each independently a number from 0.01 to 0.99, provided that the sum of m and n is 1, m is, for example, in a range of 0.6 to 0.9, and n is, for example, in a range of 0.1 to 0.4, m+n=1,

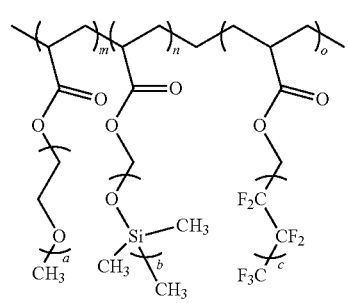

Formula 11

In Formula 11, m, n, and o are each independently a number from 0.01 to 0.99, provided that the sum of m, n, and o is 1, m is, for example, 0.4, n is, for example, 0.4, o is, for example, 0.2, a is 10, b is 50, and c is 8, m+n+o=1,

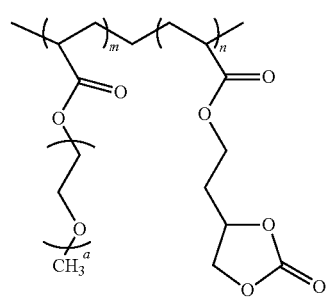

Formula 4a

In Formula 4a, a is 10, m and n are each independently a number from 0.01 to 0.99, provided that the sum of m and n is 1, m is in a range of 0.5 to 0.75, and n is in a range of 0.25 to 0.5, m+n=1,

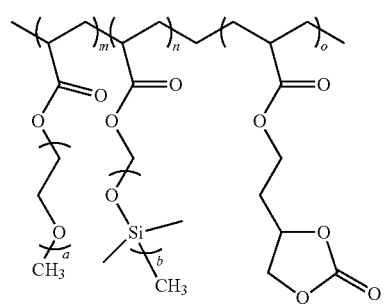

Formula 5a

In Formula 5a, a is 10, b is 50, m, n, and o are each independently a number from 0.01 to 0.99, provided that the sum of m, n, and o is 1, m is, for example, 0.4, n is, for example, 0.4, and o is, for example, 0.2, m+n+o=1.

Formula 8a

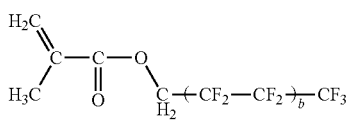

In Formula 8a, b is 3,

Formula 8b

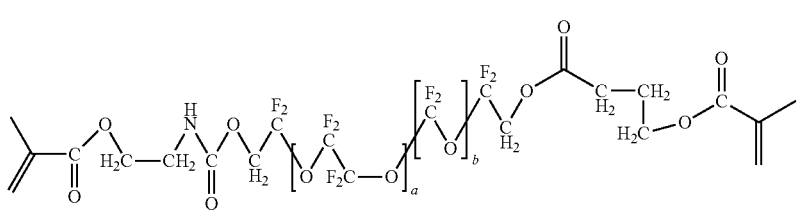

In Formula 8b, a is 6 and b is 8.

Ion conductivity of the polymer electrolyte is 0.01 mS/cm or greater, or, for example, in a range of about 0.05 mS/cm to about 0.12 mS/cm at 60° C. Also, a Young's modulus of the polymer electrolyte is $1 \times 10^5$ megapascals (MPa) or greater. Also, a glass transition temperature of the copolymer changes depending on types of the at least one first repeating unit and the at least one second repeating unit, and a mixing ratio thereof. The glass transition temperature may be in a range of about −80° C. to about 25° C., or, for example, in a range of about −70° C. to about 25° C., about −75° C. to about 10° C., about −70° C. to about 0° C., or about −70° C. to about −60° C.

The polymer electrolyte according to an embodiment further includes a lithium salt. Here, an amount of the lithium salt may be in a range of about 20 parts to about 100 parts by weight based on 100 parts by weight of the copolymer.

The lithium salt may be at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $Li(CF_3SO_2)_3C$, $LiSbF_6$, $Li(FSO_2)_2N$, $LiC_4F_9SO_3$, $LiN(SO_2CF_2CF_3)_2$, $LiPF_3(C_2F_5)_3$, $LiPF_3(CF_3)_3$, LiCl, LiF, LiBr, LiI, lithium difluoro(oxalato)borate (LiFOB), and lithium(bis(oxalato)borate (LiBOB).

A glass transition temperature of the copolymer may be in a range of about −70° C. to about 25° C., and a weight average molecular weight of the copolymer may be from about 20,000 to about 500,000 Da, or, for example, from about 30,000 to about 300,000 Da or from about 100,000 to about 250,000 Da.

An oxidation potential (vs. Li/Li$^+$) of the copolymer may be about 4.0 V or greater, or, for example, in a range of about 4.0 V to about 4.5 V. Also, a lithium ion transference number of the copolymer according to one of the embodiments may be in a range of about 0.22 to about 0.4, or, for example, about 0.22 to about 0.35.

The polymer electrolyte may further include at least one selected from an organic solvent, an ionic liquid, a polymer ionic liquid, and an inorganic particle.

The polymer electrolyte according to an embodiment may be useful as a polymer electrolyte of a lithium metal battery.

The polymer electrolyte further includes at least one selected from an ionic liquid and a polymer ionic liquid.

The polymer electrolyte according to an embodiment may be used in a lithium air battery or a lithium sulfur battery, each of which may be a lithium metal battery including a lithium electrode. The lithium electrode includes a lithium metal or a lithium metal alloy.

For example, the lithium metal battery may include all of a lithium air battery, a lithium ion battery, a lithium polymer battery, and a lithium sulfur battery.

The polymer electrolyte according to an embodiment may be used as a protective layer or an electrolyte of a lithium electrode. The polymer electrolyte may have improved interfacial characteristics and improved lithium transfer capability with a high lithium transference number.

An example of a method of preparing a polymer electrolyte according to an embodiment now will be described below.

First, a precursor of at least one first repeating unit represented by Formula 1 and a precursor of at least one second repeating unit represented by Formula 2 may be mixed to prepare a mixture, a polymerization initiator may be added to the mixture to obtain a polymer electrolyte composition, followed by polymerization of the polymer electrolyte composition. A mixing ratio of the precursor of the at least one first repeating unit represented by Formula 1 and the precursor of the at least one second repeating unit represented by Formula 2 may be controlled to correspond to a mixing ratio of the at least one first repeating unit and the at least one second repeating unit in the desired copolymer.

The precursor of the at least one first repeating unit represented by Formula 1 may be a compound represented by Formula 7, and the precursor of the at least one second repeating unit represented by Formula 2 may be a compound represented by Formula 8.

Formula 7

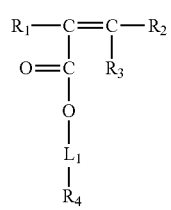

In Formula 7, $R_1$ to $R_4$, and $L_1$ are the same as $R_1$ to $R_4$, and $L_1$ in Formula 1.

Formula 8

$$R_5-C=C-R_6$$
$$O=C\quad R_7$$
$$O$$
$$L_2$$
$$G$$

In Formula 8, $R_5$ to $R_7$, $L_2$, and G are the same as $R_5$ to $R_7$, $L_2$, and G in Formula 2.

The compound represented by Formula 7 may be a compound represented by Formula 7c.

Formula 7c $$R_1-C=C-R_2$$
$$O=C\quad R_3$$
$$O$$
$$[CH_2CH_2O]_a-R_4$$

In Formula 7c, $R_1$ to $R_4$ are the same as defined in relation to Formula 7, and a is an integer from 1 to 15.

The compound represented by Formula 7 may be, for example, a compound represented by Formula 7a or a compound represented by Formula 7b.

Formula 7a

H₃C−[O−]ₐ−O−C(=O)−CH=CH₂

In Formula 7a, a is an integer from 1 to 20, or, for example, from 1 to 12, or, from 1 to 10, and a is, for example, 5 or 10.

Formula 7b

H₃C−[O−]ₐ−O−C(=O)−C(CH₃)=CH₂

In Formula 7b, a is an integer from 1 to 20, or, for example, from 1 to 12, or, from 1 to 10, and a is, for example, 5 or 10.

The compound represented by Formula 8 is, for example, a compound represented by Formula 8a, 8b, or 8c.

Formula 8a

H₂C=C(CH₃)−C(=O)−O−CH₂−(CF₂−CF₂)_b−CF₃

In Formula 8a, b is an integer from 1 to 20, or, for example, from 1 to 15, or from 2 to 8, Formula 8b

[structure with methacrylate groups connected via amide and perfluoroether linkages, with indices a and b]

In Formula 8b, a and b are each independently an integer from 1 to 20, or, for example, from 1 to 12, or from 1 to 10, or from 2 to 8.

Formula 8c

[methacrylate ester with ethyl cyclic carbonate group]

This polymerization reaction may be performed by heating or irradiation with, for example, ultraviolet (UV) rays. In this case, heat or light may be applied to avoid an adverse effect on a lithium metal electrode.

The polymerization reaction may be a copolymerization reaction, a cross-linking reaction, or a graft reaction.

When heat is applied or light such as UV is irradiated to perform polymerization, heat or light may be applied to avoid an adverse effect on a lithium metal electrode.

In some embodiments, the polymerization reaction may be performed by irradiating the polymer electrolyte composition with light at room temperature (about 25° C.). For a cross-linking reaction induced by irradiation of light, a photopolymerization initiator may be used. The photopolymerization initiator may be any compound capable of forming a radical due to light irradiation, such as irradiation with ultraviolet (UV) rays. For example, the photopolymerization initiator may be at least one selected from 2-hydroxy-2-methyl-1-phenyl-propane-1-one (HMPP), benzoin ether, dialkyl acetophenone, hydroxyl alkylketone, phenyl glyoxylate, benzyl dimethyl ketal, acyl phosphine, and a-aminoketone. For example, the acyl phosphine may be 2,4,6-trimethyl-benzoyl-trimethyl phosphine oxide.

The thermopolymerization initiator may be at least one selected from a persulfate-based initiator, an azo-based initiator, an initiator including hydrogen peroxide, and ascorbic acid. Non-limiting examples of the persulfate-based initiator are sodium persulfate ($Na_2S_2O_8$), potassium persulfate ($K_2S_2O_8$), and ammonium persulfate (($NH_4)_2S_2O_8$). Non-limiting examples of the azo-based initiator are 2,2-azobis(2-amidinopropane)dihydrochloride, 2,2-azobis-(N,N-dimethylene)isobutyramidine dihydrochloride, 2-(carbamoylazo)isobutylonitrile), 2,2-azobis[2-(2-imidazolin-2-yl)propane] dihydrochloride, 4,4-azobis-(4-cyanovaleric acid), and the like.

The photopolymerization initiator or thermopolymerization initiator may be included in an amount of about 0.005 parts to 5.0 parts by weight based on 100 parts by weight of the precursor of the at least one first repeating unit of Formula 1. While not wishing to be bound by theory, it is understood that when the amount of the photopolymerization initiator or the thermopolymerization initiator is within this range, polymerization may be easily initiated.

A lithium salt may be added to the polymer electrolyte composition. If $L_1$ of Formula 1 includes ethylene oxide, the amount of the lithium salt may be controlled within a molar mixing ratio (EO/Li) of ethylene oxide of the copolymer to lithium, the copolymer including the at least one first repeating unit of Formula 1 and the at least one second repeating unit of Formula 2, ranging from about 10 to 25. While not wishing to be bound by theory, it is understood that when the polymer electrolyte has a molar mixing ratio (EO/Li) within this range, the polymer electrolyte may have improved lithium ion mobility, improved ion conductivity, and improved mechanical characteristics, and thus, lithium dendritic growth on a surface of the negative electrode may be effectively inhibited.

At least one selected from an ionic liquid, a polymer ionic liquid, and an inorganic particle may be further added to the polymer electrolyte composition.

The ionic liquid refers to a salt in a liquid state at room temperature or a fused salt at room temperature that consists of only ions, the salt in a liquid state and the fused salt each having a melting point below or equal to room temperature. For example, the ionic liquid may be at least one selected from compounds each including: i) at least one cation selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $Cl^-$, $Br^-$, $I^-$, $SO_4^-$, $CF_3SO_3^-$, $(FSO_2)_2N^-$, $(C_2F_5SO_2)_2N^-$, $(C_2F_5SO_2)(CF_3SO_2)N^-$, and $(CF_3SO_2)_2N^-$.

In some embodiments, the ionic liquid may be at least one selected from N-methyl-N-propylpyrrolidinium bis(trifluoromethylsulfonyl)imide, N-butyl-N-methyl-pyrrolidinium bis(trifluoromethylsulfonyl)imide, 1-butyl-3-methyl-imidazolium bis(trifluoromethylsulfonyl)imide, and 1-ethyl-3-methyl-imidazolium bis(trifluoromethylsulfonyl)imide.

The amount of the ionic liquid may be in a range of about 5 parts to about 40 parts by weight, and in some embodiments, about 10 parts to about 20 parts by weight, based on 100 parts by weight of the copolymer including the at least one first repeating unit represented by Formula 1 and the at least one second repeating unit represented by Formula 2 of the polymer electrolyte. While not wishing to be bound by theory, it is understood that when the amount of the ionic liquid is within any of these ranges, the polymer electrolyte may have improved ion conductivity and improved mechanical properties.

When the polymer electrolyte includes an ionic liquid and a lithium salt, a molar ratio (IL/Li) of the ionic liquid (IL) to lithium ions (Li) may be in a range of about 0.1 to about 2.0, and in some embodiments, about 0.2 to about 1.8, and in some other embodiments, about 0.4 to about 1.5. While not wishing to be bound by theory, it is understood that when the molar ratio of the ionic liquid to lithium ions is within any of these ranges, the polymer electrolyte may have high lithium ion mobility, good ion conductivity, and improved mechanical properties, such that lithium dendrite growth is effectively suppressed on a surface of a negative electrode.

The polymer ionic liquid may be, for example, a polymerization product of ionic liquid monomers, or a polymeric compound. The polymer ionic liquid is highly soluble in an organic solvent, and thus, may further improve the ionic conductivity of the polymer electrolyte when further added.

When a polymer ionic liquid is prepared by polymerization of ionic liquid monomers as described above, a reaction product from the polymerization may need to be washed and dried, and may be further subjected to an anionic substitution reaction to include appropriate anions that may impart solubility in an organic solvent.

In some embodiments, the polymer ionic liquid may include a repeating unit including: i) at least one cation selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and ii) at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some other embodiments, the polymer ionic liquid may be prepared by polymerization of ionic liquid monomers as described above. For example, the ionic liquid monomers may have a polymerizable functional group such as a vinyl group, an allyl group, an acrylate group, and a methacrylate group, and may include at least one cation selected from an ammonium cation, a pyrrolidinium cation, a pyridinium cation, a pyrimidinium cation, an imidazolium cation, a piperidinum cation, a pyrazolium cation, an oxazolium cation, a pyridazinium cation, a phosphonium cation, a sulfonium cation, a triazolium cation, and mixtures thereof, and at least one of the above-listed anions.

Non-limiting examples of the ionic liquid monomers are 1-vinyl-3-ethylimidazolium bromide, a compound represented by Formula 9a, and a compound represented by Formula 10a.

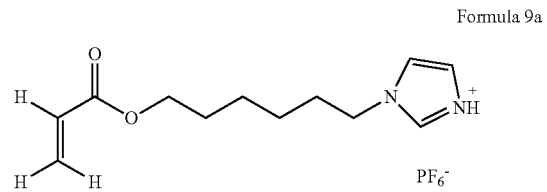

Formula 9a

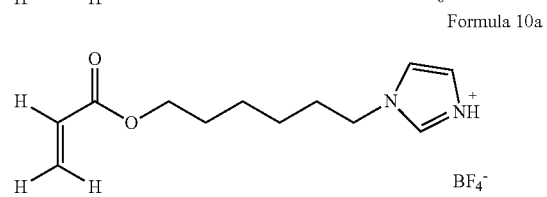

Formula 10a

For example, the polymer ionic liquid may be a compound represented by Formula 11a or a compound represented by Formula 12.

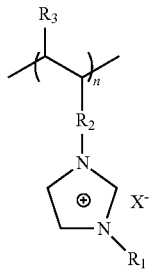

Formula 11a

In Formula 11a, $R_1$ and $R_3$ may be each independently hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C2-C30 heteroaryl group, or a substituted or unsubstituted C4-C30 carbocyclic group;

$R_2$ may be a chemical bond or a C1-C3 alkylene group, a C6-C30 arylene group, a C2-C30 heteroarylene group, or a C4-C30 divalent carbocyclic group;

$X^-$ indicates an anion of the ionic liquid; and n may be an integer from 500 to 2,800.

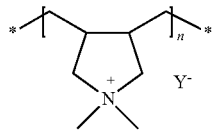

Formula 12

In Formula 12, $Y^-$ may be the same as $X^-$ in Formula 11a; and n may be an integer from 500 to 2,800.

For example, in Formula 12, $Y^-$ may be bis(trifluoromethylsulfonyl)imide (TFSI), bis(fluorosulfonyl)imide, $BF_4^-$, or $CF_3SO_3^-$.

In another example, the polymer ionic liquid may include a cation selected from poly(1-vinyl-3-alkylimidazolium) cation, poly(1-allyl-3-alkylimidazolium) cation, and poly(1-(methacryloyloxy-3-alkylimidazolium) cation, and an anion selected from $C_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

For example, the compound of Formula 12 may be polydiallyldimethyl ammonium bis(trifluoromethylsulfonyl)imide.

In some other embodiments, the polymer ionic liquid may include a low-molecular weight polymer, a thermally stable ionic liquid, and a lithium salt. The low-molecular weight polymer may have an ethylene oxide chain. The low-molecular weight polymer may be a glyme. Non-limiting examples of the glyme are polyethylene glycol dimethyl ether (polyglyme), tetraethylene glycol dimethyl ether (tetraglyme), and triethylene glycol dimethyl ether (triglyme).

The low-molecular weight polymer may have a weight average molecular weight of about 75 grams per mole (g/mol) to about 2,000 g/mol, for example, a weight average molecular weight of about 250 g/mol to about 500 g/mol. In some embodiments, the polymer electrolyte may further include an oligomer. The oligomer may be at least one selected from polyethylene glycol dimethyl ether and polyethylene glycol diethyl ether. The oligomer may have a weight average molecular weight of about 200 g/mol to about 2,000 g/mol. The amount of the oligomer may be about 5 parts to about 50 parts by weight based on 100 parts by weight of the polymer electrolyte. While not wishing to be bound by theory, it is understood that when such an oligomer is further added, the polymer electrolyte may have further improved film formability, mechanical properties, and ion conductivity characteristics.

According to another aspect of the present disclosure, a lithium metal battery includes: a positive electrode; a negative electrode including a lithium metal or a lithium metal alloy; and a polymer electrolyte according to any of the above-described embodiments.

After repeated cycles of charging and discharging, structural stability of the polymer electrolyte in the lithium metal battery may be maintained. This is believed to be attributed to the fact that the backbone of a polymerization product forming the polymer electrolyte consists of a fluorine-based polymer having good flexibility and strong mechanical strength, wherein the fluorine-based polymer is immiscible with a liquid electrolyte having a high dielectric constant, and thus, may maintain strong intensity during operation of the lithium metal battery. Furthermore, due to an ion-conductive polymer introduced into a side chain of the polymerization product, lithium ion transfer characteristics may be improved.

A lithium deposit layer on the negative electrode may have an improved deposition density of about 0.2 to 0.4 grams per cubic centimeter (g/cc).

The lithium metal battery may have a high driving voltage of about 4.0 V or greater, for example, about 4.0 to 5.0 V.

In some embodiments, the polymer electrolyte of the lithium metal battery may be a mixed electrolyte further including at least one of a liquid electrolyte, a solid electrolyte, a gel electrolyte, and a polymer ionic liquid, in addition to a polymer electrolyte, according to any of the above-described embodiments. In some embodiments, the lithium metal battery may further include a separator.

In some embodiments, the lithium metal battery may further include at least one selected from a liquid electrolyte, a polymer ionic liquid, a solid electrolyte, and a gel electrolyte. For example, the at least one selected from a liquid electrolyte, a polymer ionic liquid, a solid electrolyte, and a gel electrolyte may be disposed between the positive electrode and the polymer electrolyte. While not wishing to be bound by theory, it is understood that when the lithium metal battery further includes at least one selected from a liquid electrolyte, a polymer ionic liquid, a solid electrolyte, and a gel electrolyte as described above, ion conductivity and mechanical properties of the polymer electrolyte may be further improved.

The gel electrolyte may be any electrolyte in gel form known in the art. For example, the gel electrolyte may include a polymer and a polymer ionic liquid. For example, the polymer may be a solid graft (block) copolymer electrolyte.

The solid electrolyte may be, for example, an organic solid electrolyte or an inorganic solid electrolyte. Non-limiting examples of the organic solid electrolyte are polyethylene derivatives, polyethylene oxide derivatives, polypropylene oxide derivatives, a phosphoric acid ester polymer, polyvinyl alcohol, polyfluoride vinylidene, and polymers including ionic dissociative groups.

Non-limiting examples of the inorganic solid electrolyte are $Li_3N$, $LiI$, $Li_5NI_2$, $Li_3N$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, $Cu_3N$, LiPON, $Li_2S.GeS_2.Ga_2S_3$, $Li_2O.11Al_2O_3$, $(Na,Li)_{1+x}Ti_{2-x}Al_x(PO_4)_3$ (wherein $0.1 \le x \le 0.9$), $Li_{1+x}Hf_{2-x}Al_x(PO_4)_3$ (wherein $0.1 \le x \le 0.9$), $Na_3Zr_2Si_2PO_{12}$, $Li_3Zr_2Si_2PO_{12}$, $Na_5ZrP_3O_{12}$, $Na_5TiP_3O_{12}$, $Na_3Fe_2P_3O_{12}$, $Na_4NbP_3O_{12}$, Na-Silicates, $Li_{0.3}La_{0.5}TiO_3$, $Na_5MSi_4O_{12}$ (wherein M may be a rare earth element, such as Nd, Gd, Dy, or the like), $Li_5ZrP_3O_{12}$, $Li_5TiP_3O_{12}$, $Li_3Fe_2P_3O_{12}$, $Li_4NbP_3O_{12}$, $Li_{1+x}(M,Al,Ga)_x(Ge_{1-y}Ti_y)_{2-x}(PO_4)_3$ (wherein $x \le 0.8$, $0 \le y \le 1.0$, and M may be Nd, Sm, Eu, Gd, Tb, Dy, Ho, Er, Tm, or Yb), $Li_{1+x+y}Q_xTi_{2-x}Si_yP_{3-y}O_{12}$ (wherein $0 < x \le 0.4$, $0 < y \le 0.6$, and Q may be Al or Ga), $Li_6BaLa_2Ta_2O_{12}$, $Li_7La_3Zr_2O_{12}$, $Li_5La_3M_2O_{12}$ (wherein M may be Nb or Ta), and $Li_{7+x}A_xLa_{3-x}Zr_2O_{12}$ (wherein $0 < x < 3$, and A may be Zn).

Figure 2A:
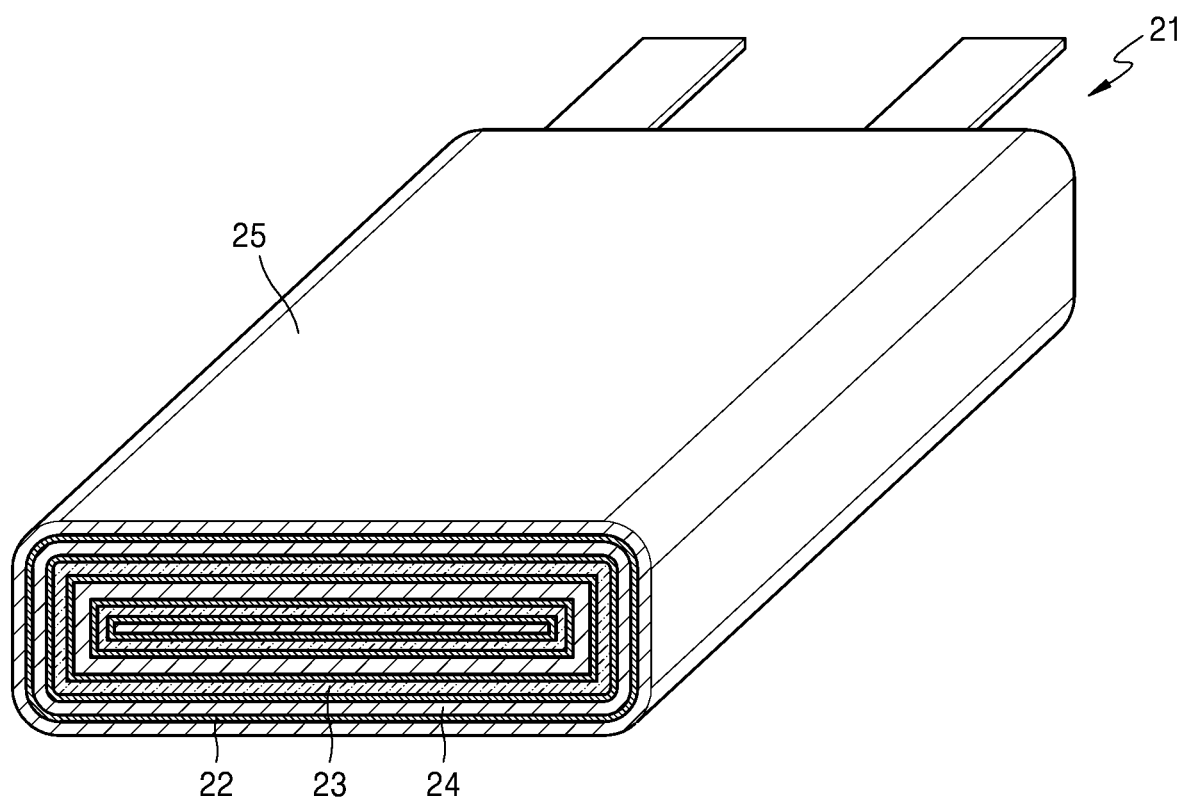
FIG. 2A is a schematic view illustrating a structure of a lithium metal battery according to an embodiment.

FIG. 2A is a schematic view illustrating a structure of a lithium metal battery 21 according to an embodiment, wherein the lithium metal battery 21 includes a polymer electrolyte according to any of the above-described embodiments.

Referring to FIG. 2A, the lithium metal battery 21 may include a positive electrode 22; a negative electrode 23; and a polymer electrolyte 24 disposed between the positive electrode 22 and the negative electrode 23, the polymer electrolyte 24 being a polymer electrolyte according to any of the above-described embodiments; and a battery case 25 accommodating the positive electrode 22, the negative electrode 23, and the polymer electrolyte 24.

For example, the positive electrode may be a porous positive electrode. The porous positive electrode may be a positive electrode including pores, or any positive electrode that allows permeation of liquid electrolyte thereinto by, for example, capillary action.

For example, the porous positive electrode may be a positive electrode that may be obtained by coating a positive active material composition including a positive active material, a conductive agent, a binding agent, and a solvent, and drying the resulting structure. The resulting positive electrode may include pores among particles of a positive active material. The porous positive electrode may be impregnated with a liquid electrolyte.

In some embodiments, the lithium metal battery 21 may include a liquid electrolyte, a gel electrolyte, or a solid electrolyte. The liquid electrolyte, the gel electrolyte, and the solid electrolyte may each be any electrolyte available for a lithium battery in the art that does not react with the positive active material, and thus, may prevent deterioration of the positive active material during charging and discharging.

The constituent elements of a lithium metal battery according to an embodiment, including a polymer electrolyte according to any of the above-described embodiments, and a method of manufacturing the lithium metal battery including the constituent elements now will be described in detail.

A positive active material for the positive electrode may include at least one selected from lithium cobalt oxide, lithium nickel cobalt manganese oxide, lithium nickel cobalt aluminum oxide, lithium iron phosphate, and lithium manganese oxide, but is not limited thereto. Any positive active materials available in the art may be used.

For example, the positive active material may be a compound represented by one of the following formulae: $Li_aA_{1-b}B'_bD'_2$ (wherein $0.90 \le a \le 1.8$ and $0 \le b \le 0.5$); $Li_aE_{1-b}B'_bO_{2-c}D'_c$ (wherein $0.90 \le a \le 1.8$, $0 \le b \le 0.5$, and $0 \le c \le 0.05$); $LiE_{2-b}B'_bO_{4-c}D'_c$ (wherein $0 \le b \le 0.5$ and $0 \le c \le 0.05$); $Li_aNi_{1-b-c}Co_b'{}_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Co_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB'_cD'_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB'_cO_{2-\alpha}F'_\alpha$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$ and $0.001 \le b \le 0.1$); $Li_aMnG_bO_2$ (wherein $0.90 \le a \le 1.8$ and $0.001 \le b \le 0.1$); $Li_aMn_2G_bO_4$ (wherein $0.90 \le a \le 1.8$ and $0.001 \le b \le 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the above formulae, A may be nickel (Ni), cobalt (Co), manganese (Mn), or any combination thereof; B' may be aluminum (Al), nickel (Ni), cobalt (Co), manganese (Mn), chromium (Cr), iron (Fe), magnesium (Mg), strontium (Sr), vanadium (V), a rare earth element, or any combination thereof; D' may be oxygen (O), fluorine (F), sulfur (S), phosphorus (P), or any combination thereof; E may be cobalt (Co), manganese (Mn), or any combination thereof; F' may be fluorine (F), sulfur (S), phosphorus (P), or any combination thereof; G may be aluminum (Al), chromium (Cr), manganese (Mn), iron (Fe), magnesium (Mg), lanthanum (La), cerium (Ce), strontium (Sr), vanadium (V), or any combination thereof; Q may be titanium (Ti), molybdenum (Mo), manganese (Mn), or any combination thereof; I' may be chromium (Cr), vanadium (V), iron (Fe), scandium (Sc), yttrium (Y), or any combination thereof; and J may be vanadium (V), chromium (Cr), manganese (Mn), cobalt (Co), nickel (Ni), copper (Cu), or any combination thereof.

For example, the positive active material may be one selected from compounds represented by Formulae 13 to 16.

$$Li_aNi_bCo_cMn_dO_2 \qquad \text{Formula 13}$$

In Formula 13, $0.90 \le a \le 1.8$, $0 \le b \le 0.9$, $0 \le c \le 0.5$, and $0 \le d \le 0.5$.

$$Li_2MnO_3 \qquad \text{Formula 14}$$

$$LiMO_2 \qquad \text{Formula 15}$$

In Formula 15, M may be Mn, Fe, Co, or Ni.

$$Li_aNi_bCo_cAl_dO_2 \qquad \text{Formula 16}$$

In Formula 16, $0.90 \le a \le 1.8$, $0 \le b \le 0.9$, $0 \le c \le 0.5$, and $0 \le d \le 0.5$.

The positive electrode of the lithium metal battery may be manufactured as follows.

A positive active material, a binder, and a solvent are mixed to prepare a positive active material composition.

A conductive agent may be further added into the positive active material composition.

The positive active material composition may be directly coated on a metallic current collector and dried to prepare a positive electrode plate. Alternatively, the positive active material composition may be cast on a separate support to form a positive active material film. The positive active material film may then be separated from the support and then laminated on a metallic current collector to prepare a positive electrode plate.

The binder is an ingredient that may aid binding of an active material and a conductive agent and may aid binding to a current collector. The amount of the binder added may be from about 1 part to about 50 parts by weight based on 100 parts by weight of a total weight of the positive active material. Non-limiting examples of the binder include polyvinylidene fluoride (PVDF), polyvinyl alcohol, carboxymethylcellulose (CMC), starch, hydroxypropylcellulose, reproduced cellulose, polyvinylpyrrolidone, polytetrafluoroethylene, polyethylene, polypropylene, ethylene-propylene-diene terpolymer (EPDM), sulfonated EPDM, styrene-butadiene rubber, fluorine rubber, and various copolymers. For example, the amount of the binder may be from about 2 parts to about 5 parts by weight based on 100 parts by weight of the total weight of the positive active material. While not wishing to be bound by theory, it is understood that when the amount of the binder is within any of the above ranges, the binding force of the active material layer to the current collector may be satisfactory.

The conductive agent may be any conductive material that does not cause chemical change in the lithium metal battery. Non-limiting examples of the conductive agent include graphite such as natural graphite or artificial graphite; carbonacious materials, such as carbon black, acetylene black, Ketjen black, channel black, furnace black, lamp black, or summer black; conductive fibers, such as carbon fibers or metal fibers; carbon fluoride; metal powder, such as aluminum or nickel powder; conductive whiskers, such as zinc oxide or potassium titanate; a conductive metal oxide, such as a titanium oxide; and a conductive polymer, such as a polyphenylene derivative.

The amount of the conductive agent may be from about 1 part to about 10 parts by weight, for example, from about 2 parts to about 5 parts by weight, based on 100 parts by weight of the total weight of the positive active material. While not wishing to be bound by theory, it is understood that when the amount of the conductive agent is within any of these ranges, the final positive electrode may have good conductivity characteristics.

A non-limiting example of the solvent is N-methylpyrrolidone.

The amount of the solvent may be from about 100 parts to about 2,000 parts by weight based on 100 parts by weight of the positive active material. While not wishing to be bound by theory, it is understood that when the amount of the solvent is within this range, it may become easy to perform a process of forming the active material layer.

The amounts of the positive active material, the conductive agent, the binder, and the solvent may be the same as those used in the manufacture of lithium batteries in the art. At least one of the conductive agent, the binder, and the solvent may be omitted depending on a use and a structure of the lithium metal battery.

The negative electrode may be a lithium metal thin film or a lithium metal alloy thin film as described above.

The lithium metal alloy may include lithium and a metal/metalloid alloyable with lithium. Examples of the metal/metalloid alloyable with lithium may be Si, Sn, Al, Ge, Pb, Bi, Sb, a Si—Y alloy (wherein Y may be an alkaline metal, an alkaline earth metal, a Group 13 to Group 16 element, a transition metal, a rare earth element, or a combination thereof, and may be not Si), and an Sn—Y alloy (wherein Y may be an alkaline metal, an alkaline earth metal, a Group 13 to Group 16 element, a transition metal, a rare earth element, or a combination thereof, and may not be Sn). The element Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), germanium (Ge), phosphorus (P), arsenic (As), antimony (Sb), bismuth (Bi), sulfur (S), selenium (Se), tellurium (Te), polonium (Po), or any combinations thereof.

A polymer electrolyte according to any of the above-described embodiments may be used as an electrolyte of the lithium metal battery.

In some embodiments, the lithium metal battery may further include a separator and/or a lithium salt-containing non-aqueous electrolyte that are commonly used in the art.

For example, the separator may be an insulating thin film having high ion permeability and strong mechanical strength. The separator may have a pore diameter of about 0.01 micrometers ($\mu$m) to about 10 $\mu$m, and a thickness of about 5 $\mu$m to about 20 $\mu$m. Non-limiting examples of the separator are olefin-based polymers, such as polypropylene, and sheets or non-woven fabric made of glass fiber or polyethylene. When a lithium metal battery includes a solid polymer electrolyte, the solid polymer electrolyte may also serve as the separator.

The separator may be a monolayer or a multilayer including at least two layers of polyethylene, polypropylene, polyvinylidene fluoride, or any combinations thereof. The multilayer may be a mixed multilayer. For example, the separator may be a two-layered separator including polyethylene and polypropylene layers, a three-layered separator including polyethylene, polypropylene, and polyethylene layers, or a three-layered separator including polypropylene, polyethylene, and polypropylene layers.

The lithium salt-containing non-aqueous electrolyte may include a non-aqueous electrolyte and a lithium salt.

The non-aqueous electrolyte may be a non-aqueous liquid electrolyte, an organic solid electrolyte, or an inorganic solid electrolyte.

The non-aqueous liquid electrolyte may include an organic solvent. The organic solvent may be any organic solvent available in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl iso-propyl carbonate, dipropyl carbonate, dibutyl carbonate, chloroethylene carbonate, benzonitrile, acetonitrile, tetrahydrofuran, 2-methyltetrahydrofuran, $\gamma$-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $Li(FSO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are each a natural number), LiCl, LiI, or any combination thereof.

To improve charge-discharge characteristics and flame resistance in the lithium metal battery, pyridine, triethylphosphate, triethanolamine, cyclic ether, ethylene diamine, n-glyme, hexamethyl phosphoramide, nitrobenzene derivative, sulfur, a quinone imine dye, N-substituted oxazolidinone, N,N-substituted imidazolidine, ethylene glycol dialkyl ether, an ammonium salt, pyrrole, 2-methoxyethanol, or aluminum trichloride may be added to the non-aqueous electrolyte. In some embodiments, to provide non-flammable characteristics, a halogen-containing solvent such as carbon tetrachloride, ethylene trifluoride, or the like may be further added to the non-aqueous electrolyte, if needed.

For example, a lithium metal battery according to any one of the above-described embodiments may have improved capacity and improved lifetime characteristics, and thus, may be used in a battery cell for use as a power source of a small device, and may also be used as a unit battery of a medium-large size battery pack or battery module including a plurality of battery cells for use as a power source of a medium-large size device.

Examples of the medium-large size device are electric vehicles (EVs), including hybrid electric vehicles (HEVs) and plug-in hybrid electric vehicles (PHEVs).

A lithium metal battery including a polymer electrolyte according to an embodiment secures interfacial stability between a lithium electrode and the polymer electrolyte. As a result, a lithium/lithium symmetric cell including the polymer electrolyte secures a lifespan up to 280 cycles at a current density of about 0.5 milliampere per square centimeter ($mA/cm^2$).

When the lithium metal battery according to an embodiment is a lithium metal battery including a lithium nickel cobalt aluminum composite oxide, which is a 4 V-level positive active material, charge/discharge behavior of the lithium metal battery may be confirmed at a voltage of 4.2 V.

When the polymer electrolyte is used as a negative electrode protective layer of a lithium air battery, an initial energy density may be secured to about 230 watt hours per kilogram (Wh/kg) or greater (a discharge current density: about 0.2 $mA/cm^2$).

An overvoltage of a lithium symmetrical cell including the polymer electrolyte according to an embodiment is about 100 millivolts (mV) or lower during a charging/discharging process at a constant current of 0.25 $mA/cm^2$.

Figure 7A:
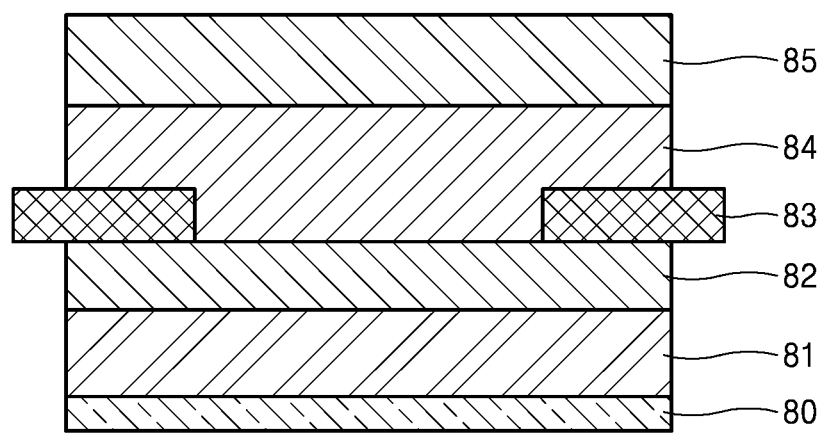
FIG. 7A is a schematic view illustrating a structure of a lithium air battery according to another embodiment.

FIG. 7A is a schematic view illustrating a structure of a lithium air battery according to another embodiment.

Referring to FIG. 7A, the lithium air battery includes a positive electrode 84; and a lithium metal negative electrode 81 formed on a copper thin film 80, which is a negative current collector, wherein the positive electrode 84 and the lithium metal negative electrode 81 use oxygen disposed on a gas diffusion layer 85 as an active material. A polymer electrolyte 82 according to an embodiment is disposed on the lithium metal negative electrode 81. A mask layer 83 is disposed between the polymer electrolyte 82 and the positive electrode 84. Here, the mask layer 83 serves as, for example, an interlayer or a lithium negative electrode protective layer, and is formed of a fluorine-based or carbonate-based functional group substituted POEM-based polymer.

The polymer electrolyte according to an embodiment may be used in a 3-dimentional (3D) lithium air battery.

Figure 2B:
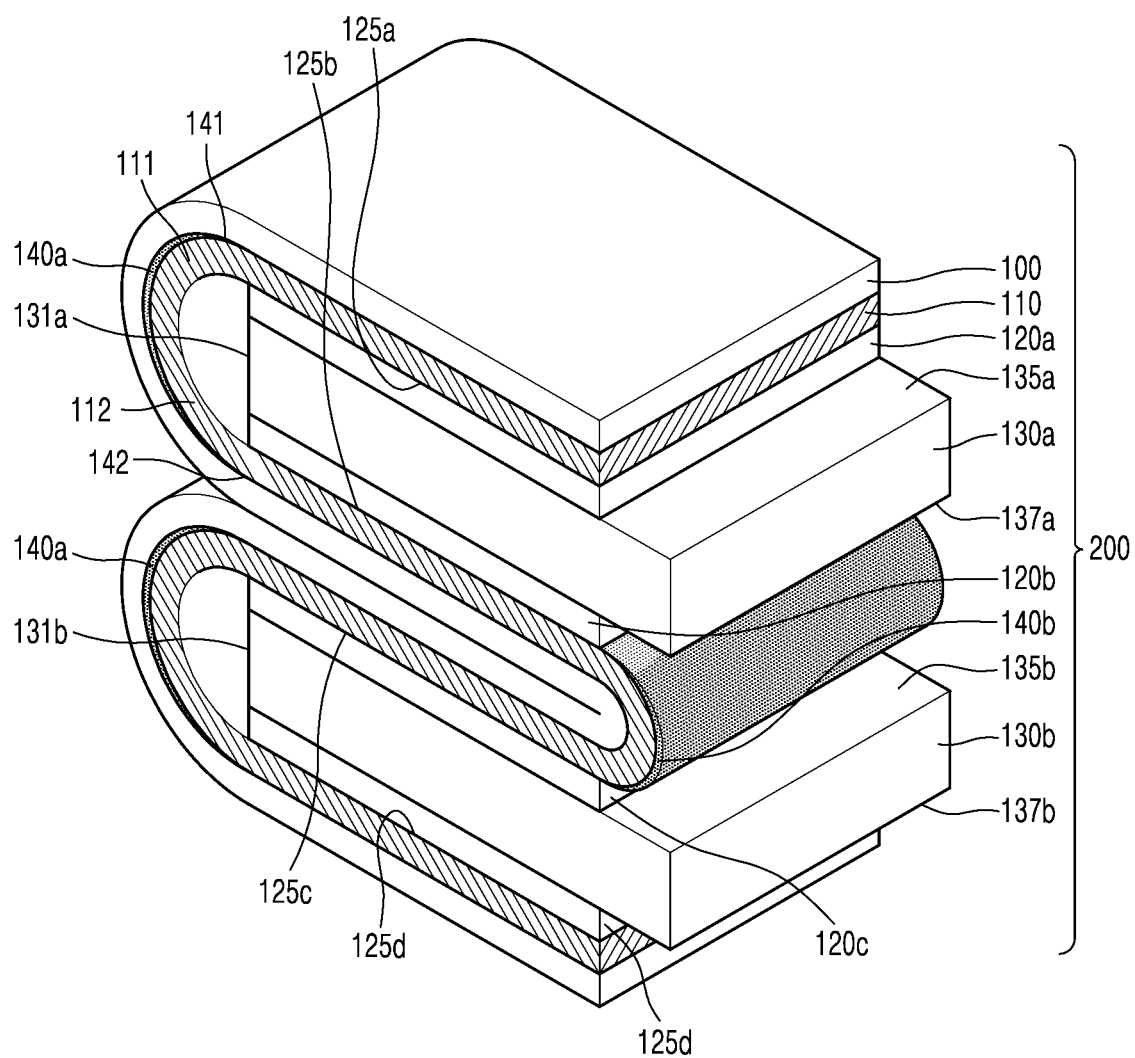
FIG. 2B is a schematic view illustrating a structure of a 3D metal-air battery according to an embodiment.

Referring to FIG. 2B, a 3D metal-air battery 200 includes a plurality of gas diffusion layers 130a and 130b that are arranged apart in a thickness direction; and a plurality of first positive electrodes 120a and 120c and a plurality of second positive electrodes 120b and 120d that are respectively disposed on one surfaces 135a and 135b and another surfaces 137a and 137b facing the one surfaces 135a and 135b of the plurality of gas diffusion layers 130a and 130b, wherein an ion conductive layer 110 is repeatedly bent by 180 degrees so that the ion conductive layer 110 may contact each of surfaces 125a, 125b, 125c, and 125d of the plurality of first positive electrodes 120a and 120c and the plurality of second positive electrodes 120b and 120d, wherein a negative electrode 100 is repeatedly bent by 180 degrees in the same pattern with the ion conductive layer 110 so that the negative electrode 110 may contact the ion conductive layer 110, wherein the negative electrode 100 may be in a folded configuration as it is bent by 180 degrees between two adjacent gas diffusion layers 130a and 130b.

The ion conductive layer 110 may include a polymer electrolyte according to an embodiment.

In the 3D metal-air battery 200, the first positive electrodes 120a and 120c and the second positive electrodes 120b and 120d are not disposed on side surfaces 131a and 131b of the gas diffusion layers 130a and 130b, and thus short circuits occurring between the negative electrode 100 and the positive electrodes 120a and 120b when the ion conductive layer 110 cracks may be prevented.

The 3D metal-air battery 200 may include a plurality of enhancer-containing interlayers 140a, 140b, and 140c that contact each of all bent parts 111 and 112 of the ion conductive layer 110. When the 3D metal-air battery 200 includes the plurality of interlayers 140a, 140b, and 140c, cracks of the ion conductive layer 110 and short circuits occurring between the negative electrode 100 and the positive electrodes 120a and 120b may be prevented.

Hereinafter are definitions of functional groups and substituents used in the chemical formulae herein.

The term "alkyl" as used in a chemical formula refers to a fully saturated branched or unbranched (or straight chain or linear) hydrocarbon group.

Examples of the "alkyl" include methyl, ethyl, n-propyl, iso-propyl, n-butyl, iso-butyl, sec-butyl, n-pentyl, iso-pentyl, neo-pentyl, iso-amyl, n-hexyl, 3-methylhexyl, 2,2-dimethylpentyl, 2,3-dimethyl pentyl, n-heptyl, etc.

At least one hydrogen atom in the "alkyl" may be substituted with a halogen atom, a C1-C20 alkyl group (e.g., $CF_3$, $CHF_2$, $CH_2F$, or $CCl_3$) substituted with a halogen atom, a C1-C20 alkoxy group, a C2-C20 alkoxyalkyl group, a hydroxyl group, a nitro group, a cyano group, an amino group, an amidino group, a hydrazine group, a hydrazone group, a carboxylic acid group or a salt thereof, a sulfonyl group, a sulfamoyl group, a sulfonic acid group or a salt thereof, a phosphoric acid group or a salt thereof, a C1-C20 alkyl group, a C2-C20 alkenyl group, a C2-C20 alkynyl group, a C1-C20 heteroalkyl group, a C6-C20 aryl group, a C7-C20 arylalkyl group, a C6-C20 heteroaryl group, a C7-C20 heteroarylalkyl group, a C6-C20 heteroaryloxy group, or a C6-C20 heteroaryloxyalkyl group.

The term "halogen atom" includes fluorine, bromine, chlorine, and iodine atoms.

The term "C1-C20 alkyl group substituted with a halogen atom" refers to a C1-C20 alkyl group substituted with at least one halo group, and examples of the "C1-C20 alkyl group substituted with a halogen atom" include monohaloalkyl or polyhaloalkyl including dihaloalkyl or perhaloalkyl.

The monohaloalkyl includes one iodine, bromine, chlorine, or fluorine in the alkyl group, and dihaloalkyl or polyhaloalkyl refers to an alkyl group having at least two halogen atoms that are identical to or different from each other.

The term "alkoxy" as used in a chemical formula refers to alkyl-O—, and the alkyl group is as described above. Examples of the "alkoxy" include methoxy, ethoxy, propoxy, 2-propoxy, butoxy, tert-butoxy, pentyloxy, and hexyloxy. In the "alkoxy" group, at least one hydrogen atom may be substituted with a substituent selected from the same substituent groups as described above in connection with the alkyl group.

The term "alkoxyalkyl" as used in a chemical formula refers to the embodiment when an alkyl group is substituted with the alkoxy group described above. At least one hydrogen atom of the "alkoxyalkyl" may be substituted with a substituent selected from the same substituent groups as described above in connection with the alkyl group. The term "alkoxyalkyl" includes a substituted alkoxyalkyl moiety.

The term "alkenyl" as used in a chemical formula refers to a branched or non-branched hydrocarbon group having at least one carbon-carbon double bond. Examples of the "alkenyl" group include vinyl, allyl, butenyl, iso-propenyl, and iso-butenyl, and at least one hydrogen atom of the "alkenyl" group may be substituted with a substituent selected from the same substituent groups as described above in connection with the alkyl group.

The term "alkynyl" as used in a chemical formula refers to a branched or non-branched hydrocarbon group having at least one carbon-carbon triple bond. Examples of the "alkynyl group" include ethynyl, butynyl, iso-butynyl, and iso-propynyl.

At least one hydrogen atom of the "alkynyl" group may be substituted with a substituent selected from the same substituent groups as described above in connection with the alkyl group.

The term "aryl" as used in a chemical formula refers to an aromatic hydrocarbon group that may be used alone or in a combination and includes at least one ring.

The term "aryl" includes a group wherein aromatic rings are fused together with one or more cycloalkyl rings.

Examples of the "aryl" include phenyl, naphthyl, and tetrahydronaphthyl.

Also, at least one hydrogen atom in the "aryl" group may be substituted with a substituent selected from the same substituent groups as described above in connection with the alkyl group.

The term "arylalkyl" as used in a chemical formula refers to an alkyl group substituted with an aryl group. Examples of the "arylakyl" include benzyl- and phenyl-$CH_2CH_2$—.

The term "aryloxy" as used in a chemical formula refers to —O-aryl, and examples of the "aryloxy" group include phenoxy. At least one hydrogen atom in the "aryloxy" group may be substituted with a substituent selected from the same substituent groups as described above in connection with the alkyl group.

The term "heteroaryl" as used in a chemical formula refers to a monocyclic or bicyclic aromatic organic group including at least one heteroatom selected from N, O, P, and S, the remaining ring atoms each being C. For example, the "heteroaryl" group may include 1 to 5 heteroatoms and may include 5 to 10 ring members, wherein S or N may be oxidized to various oxidation states.

Examples of a monocyclic "heteroaryl" group include thienyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3yl, isothiazol-4-yl, isothiazol-5-yl, oxazol-2-yl, oxazol-4-yl, oxazol-5-yl, isooxazol-3-yl, isooxazol-4-yl, isooxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, pyrazine-2-yl, pyrazine-4-yl, pyrazine-5-yl, 2-pyrimidin-2-yl, 4-pyrimidin-2-yl, and 5-pyrimidin-2-yl groups.

The term "heteroaryl" as used in a chemical formula refers to a heteroaromatic ring that is fused to one or more of an aryl group, a cycloaliphatic group, and a heterocyclic group.

Examples of a bicyclic "heteroaryl" group include indolyl, isoindolyl, indazolyl, indolizinyl, purinyl, quinolizinyl, quinolinyl, and isoquinolinyl.

Other examples of a bicyclic "heteroaryl" group include indolyl, isoindolyl, indazolyl, indolizinyl, purinyl, quinolizinyl, quinolinyl, isoquinolinyl, cinnolinyl, phthalazinyl, naphthyridinyl, quinazolinyl, quinoxalinyl, phenanthridinyl, phenathrolinyl, phenazinyl, phenothiazinyl, phenoxazinyl, benzisoquinolinyl, thieno[2,3-b]furanyl, furo[3,2-b]-pyranyl, 5H-pyrido[2,3-d]-o-oxazinyl, 1H-pyrazolo[4,3-d]-oxazolyl, 4H-imidazo[4,5-d]thiazolyl, pyrazino[2,3-d]pyridazinyl, imidazo[2,1-b]thiazolyl, imidazo[1,2-b][1,2,4]triazinyl, 7-benzo[b]thienyl, benzoxazolyl, benzimidazolyl, benzothiazolyl, benzoxazepinyl, benzoxazinyl, 1H-pyrrolo[1,2-b][2]benzazapinyl, benzofuryl, benzothiophenyl, benzotriazolyl, pyrrolo[2,3-b]pyridinyl, pyrrolo[3,2-c]pyridinyl, pyrrolo[3,2-b]pyridinyl, imidazo[4,5-b]pyridinyl, imidazo[4,5-c]pyridinyl, pyrazolo[4,3-d]pyridinyl, pyrazolo[4,3-c]pyridinyl, pyrazolo[3,4-c]pyridinyl, pyrazolo[3,4-d]pyridinyl, pyrazolo[3,4-b]pyridinyl, imidazo[1,2-a]pyridinyl, pyrazolo[1,5-a]pyridinyl, pyrrolo[1,2-b]pyridazinyl, imidazo[1,2-c]pyrimidinyl, pyrido[3,2-d]pyrimidinyl, pyrido[4,3-d]pyrimidinyl, pyrido[3,4-d]pyrimidinyl, pyrido[2,3-d]pyrimidinyl, pyrido[2,3-b]pyrazinyl, pyrido[3,4-b]pyrazinyl, pyrimido[5,4-d]pyrimidinyl, pyrazino[2,3-b]pyrazinyl, and pyrimido[4,5-d]pyrimidinyl groups.

At least one hydrogen atom in the "heteroaryl" group may be substituted with a substituent selected from the same substituent groups as described above in connection with the alkyl group.

The term "heteroarylalkyl" as used in a chemical formula refers to an alkyl group substituted with heteroaryl.

The term "heteroaryloxy" as used in a chemical formula refers to an —O-heteroaryl moiety. At least one hydrogen atom in the "heteroaryloxy" group may be substituted with a substituent selected from the same substituent groups as described above in connection with the alkyl group.

The term "heteroaryloxyalkyl" as used in a chemical formula denotes an alkyl group substituted with heteroaryloxy. At least one hydrogen atom in the "heteroaryloxyalkyl" group may be substituted with a substituent selected from the same substituent groups as described above in connection with the alkyl group.

The term "carbon ring" as used in a chemical formula refers to a saturated or partially unsaturated non-aromatic monocyclic, bicyclic, or tricyclic hydrocarbon group.

Examples of the monocyclic hydrocarbon group include cyclopentyl, cyclopentenyl, cyclohexyl, and cyclohexenyl groups.

Examples of the bicyclic hydrocarbon group include bornyl, decahydronaphthyl, bicyclo[2.1.1]hexyl, bicyclo[2.2.1]heptyl, bicyclo[2.2.1]heptenyl, and bicyclo[2.2.2]octyl groups.

An example of the tricyclic hydrocarbon group is an adamantyl group.

At least one hydrogen atom in the "carbon ring" may be substituted with a substituent selected from the same substituent groups as described above in connection with the alkyl group.

The term "a hetero-ring group" as used in a chemical formula refers to a ring group composed of 5 to 10 atoms containing a heteroatom, such as nitrogen, sulfur, phosphorus, or oxygen. An example of the hetero-ring group is a pyridyl group, and at least one hydrogen atom in the "hetero-ring group" may be substituted with a substituent selected from the same substituent groups as described above in connection with the alkyl group.

The term "hetero-ring-oxy" refers to an —O-hetero-ring, and at least one hydrogen atom in the "hetero-ring-oxy" group may be substituted with a substituent selected from the same substituent groups as described above in connection with the alkyl group.

The term "sulfonyl" as used in a chemical formula denotes R"—SO$_2$—, wherein, R" is a hydrogen atom, an alkyl group, an aryl group, a heteroaryl group, an aryl-alkyl group, a heteroaryl-alkyl group, an alkoxy group, an aryloxy group, a cycloalkyl group, or a hetero-ring group.

The term "sulfamoyl" as used in a chemical formula denotes H$_2$NS(O$_2$)—, alkyl-NHS(O$_2$)—, (alkyl)$_2$NS(O$_2$)-aryl-NHS(O$_2$)—, alkyl-(aryl)-NS(O$_2$)—, (aryl)$_2$NS(O)$_2$, heteroaryl-NHS(O$_2$)—, (aryl-alkyl)-NHS(O$_2$)—, or (heteroaryl-alkyl)-NHS(O$_2$)—.

At least one hydrogen atom in the "sulfamoyl group" may be substituted with a substituent selected from the same substituent groups as described above in connection with the alkyl group.

The term "amino group" includes a nitrogen atom that is covalently bonded to at least one carbon atom or heteroatom. The "amino group" includes —NH$_2$ and substituted moieties.

Also, examples of the "amino group" include an alkylamino group, in which a nitrogen atom is bonded to at least one additional alkyl group, and an aryl amino group or a diarylamino group, in which a nitrogen atom is bonded to one or two independently selected aryl groups.

The terms "alkylene", "alkenylene", "alkynylene", "arylene", and "heteroarylene" are, each respectively, the same as defined for "alkyl", "alkenyl", "alkynyl", "aryl", and "heteroaryl", except that monovalent groups of the "alkyl", "alkenyl", "alkynyl", "aryl", and "heteroaryl" are replaced with divalent groups.

A least one hydrogen atom in the "alkylene", "alkenylene", "alkynylene", "arylene", and "heteroarylene" may be substituted with a substituent selected from the same substituent groups as described above in connection with the alkyl group.

When a group containing a specified number of carbon atoms is substituted with any of the groups listed in the preceding paragraphs, the number of carbon atoms in the resulting "substituted" group is defined as the sum of the carbon atoms contained in the original (unsubstituted) group and the carbon atoms (if any) contained in the substituent. For example, when the term "substituted C1-C30 alkyl" refers to a C1-C30 alkyl group substituted with C6-C30 aryl group, the total number of carbon atoms in the resulting aryl substituted alkyl group is C7-C60.

Hereinafter, the present disclosure will be described in further detail with reference to the following examples. These examples are provided for illustrative purposes only and are not intended to limit the scope of the present inventive concepts.

EXAMPLES

Example 1a

Preparation of Polymer Electrolyte

A polyoxyethylene methacrylate-monofunctional fluoromethacrylate copolymer electrolyte was prepared as follows.

Monofunctional fluoromethacrylate of Formula 8a, lithium bis(trifluoromethanesulfonyl)imide (LiTFSI) as a lithium salt, poly(ethylene glycol) methyl ether acrylate (POEM) of Formula 7a, and tetrahydrofuran (THF) as a solvent were mixed. Here, an amount of THF was about 500 parts by weight based on 100 parts by weight of the total amount of monofunctional fluoromethacrylate, LiTFSI, and POEM of Formula 7a. Also, a molar mixing ratio of POEM to monofunctional fluoromethacrylate was about 2:1.

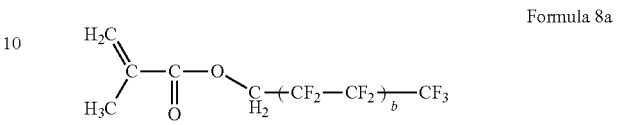

Formula 8a

In Formula 8a, b is 8,

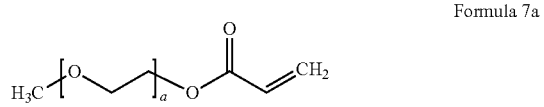

Formula 7a

In Formula 7a, a is 10.

A photoinitiator (Darocur® 1173, available from BASF) was added to the mixture to obtain a polymer electrolyte composition. An amount of the photoinitiator was about 5 parts by weight based on 100 parts by weight of monofunctional fluoromethacrylate.

The polymer electrolyte composition was cast on a support substrate, followed by UV irradiation under a N$_2$ atmosphere to thereby obtain a polymer electrolyte having a thickness of 30 micrometers (μm) including a copolymer represented by Formula 3a. Here, an amount of the lithium salt (LiTFSI) was controlled so that a molar mixing ratio of ethylene oxide in POEM to lithium in the lithium salt was 15:1.

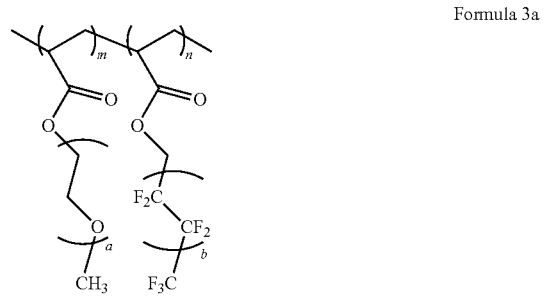

Formula 3a

In Formula 3a, a is 10, b is 8, m is 0.67, and n is 0.33.

The polymer of Formula 3a is a random copolymer which has a degree of polymerization of about 200 and a weight average molecular weight ranging from about 90,000.

Example 1b

Preparation of Polymer Electrolyte

A polymer electrolyte including a copolymer represented by Formula 3a was prepared at a thickness of 30 μm in the same manner as in Example 1a, except that a molar mixing ratio of POEM to monofunctional fluoromethacrylate was changed to about 5:1.

Formula 3a

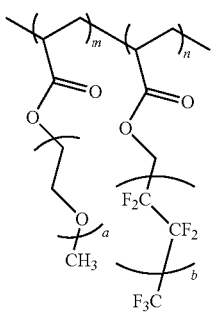

In Formula 3a, a is 10, b is 8, m is 0.83, and n is 0.17.

The polymer of Formula 3a is a random copolymer having a degree of polymerization of about 200 and a weight average molecular weight ranging from about 80,000 to about 100,000.

Example 1c

Preparation of Polymer Electrolyte

A polymer electrolyte including a copolymer represented by Formula 3a was prepared at a thickness ranging from about 20 μm to about 30 μm in the same manner as in Example 1a, except that succinonitrile (SN) was added during preparation of the polymer electrolyte composition. An amount of succinonitrile was about 20 parts by weight based on 100 parts by weight of the total weight of the polymer electrolyte composition.

Example 2a

Preparation of Polymer Electrolyte

A polymer electrolyte including a copolymerization product of POEM of Formula 7a and a compound represented by Formula 8b was prepared at a thickness of 30 μm in the same manner as in Example 1a, except that a compound (dPFPE) represented by Formula 8b was used instead of monofunctional fluoromethacrylate represented by Formula 8a, and a molar mixing ratio of POEM to dPFPE represented by Formula 8b when mixed was 8:2 (4:1). The copolymer had a weight average molecular weight of about 80,000 and a degree of polymerization of about 300.

Formula 8b

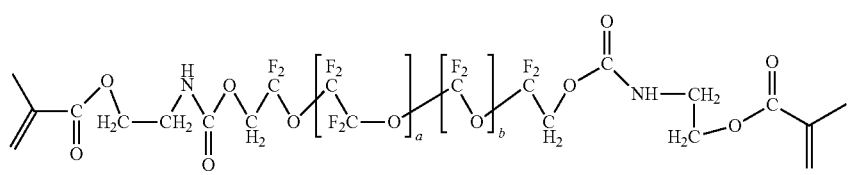

In Formula 8b, a is 6, and b is 8.

Example 2b

Preparation of Polymer Electrolyte

A polymer electrolyte including a copolymerization product of POEM of Formula 7a and a compound represented by Formula 8b was prepared at a thickness of 30 μm in the same manner as in Example 2a, except that a molar mixing ratio of POEM to dPFPE represented by Formula 8b was changed to 3:1. The copolymer had a weight average molecular weight of about 80,000 and a degree of polymerization of about 300.

Example 3a

Preparation of Polymer Electrolyte

A polymer electrolyte including a copolymer represented by Formula 4a was prepared at a thickness of 30 μm in the same manner as in Example 1a, except that glycerol carbonate methacrylate of Formula 9 was used instead of monofunctional fluoromethacrylate represented by Formula 8a, and a molar mixing ratio of POEM to glycerol carbonate methacrylate was 1:1. The copolymer represented by Formula 4a had a weight average molecular weight of about 100,000 and a degree of polymerization of about 300.

Formula 9

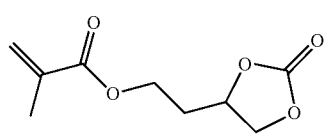

Formula 4a

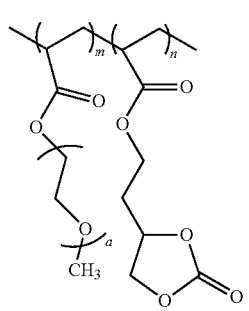

In Formula 4a, a is 10, m is 0.5, and n is 0.5.

Example 3b

Preparation of Polymer Electrolyte

A polymer electrolyte including a copolymer represented by Formula 4a was prepared at a thickness of 30 μm in the same manner as in Example 1a, except that glycerol carbonate methacrylate of Formula 9 was used instead of monofunctional fluoromethacrylate represented by Formula 8a, and a molar mixing ratio of POEM to glycerol carbonate methacrylate was 3:1. The copolymer represented by Formula 4a had a weight average molecular weight of about 80,000 and a degree of polymerization of about 200.

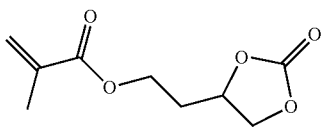

Formula 9

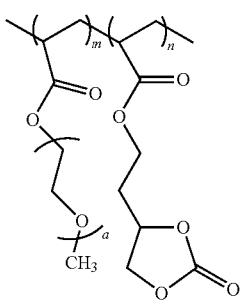

Formula 4a

In Formula 4a, a is 10, m is 0.75, and n is 0.25.

Example 3c

Preparation of Polymer Electrolyte

A polymer electrolyte including a copolymer represented by Formula 4a was prepared at a thickness of 30 μm in the same manner as in Example 1a, except that glycerol carbonate methacrylate of Formula 9 was used instead of monofunctional fluoromethacrylate represented by Formula 8a, and a molar mixing ratio of POEM to glycerol carbonate methacrylate was 4:1. The copolymer represented by Formula 4a had a weight average molecular weight of about 80,000 and a degree of polymerization of about 200.

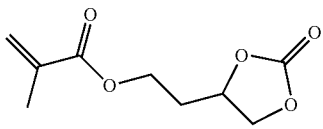

Formula 9

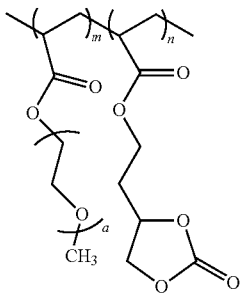

Formula 4a

In Formula 4a, a is 10, m is 0.8, and n is 0.2.

Example 3d

Preparation of Polymer Electrolyte

A polymer electrolyte including a copolymer represented by Formula 4a was prepared at a thickness ranging from about 20 μm to about 30 μm in the same manner as in Example 3a, except that succinonitrile (SN) was added during preparation of the polymer electrolyte composition. An amount of succinonitrile was about 20 parts by weight based on 100 parts by weight of the total weight of the polymer electrolyte composition.

Example 3e

Preparation of Polymer Electrolyte

A polymer electrolyte including a copolymer was prepared at a thickness ranging from about 20 μm to about 30 μm in the same manner as in Example 3b, except that succinonitrile (SN) was added during preparation of the polymer electrolyte composition. An amount of succinonitrile was about 20 parts by weight based on 100 parts by weight of the total weight of the polymer electrolyte composition.

Example 3f

Preparation of Polymer Electrolyte

A polymer electrolyte was prepared at a thickness ranging from about 20 μm to about 30 μm in the same manner as in Example 3c, except that succinonitrile was added during preparation of the polymer electrolyte composition. An amount of succinonitrile (SN) was about 20 parts by weight based on 100 parts by weight of the total weight of the polymer electrolyte composition.

Example 4

Preparation of Polymer Electrolyte

A polymer electrolyte was prepared at a thickness of about 20 μm in the same manner as in Example 1a, except that glycerol carbonate acrylate of Formula 9 was used instead of monofunctional fluoromethacrylate, and a molar mixing ratio of POEM to glycerol carbonate acrylate was 5:1.

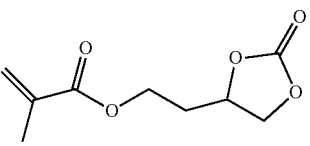

Formula 9

The copolymer had a weight average molecular weight of about 90,000, a degree of polymerization of about 200, and a polydispersity)PDI) of about 1.4

Example 5

Preparation of Polymer Electrolyte

A polymer electrolyte including a copolymer represented by Formula 11 was prepared at a thickness of about 30 μm in the same manner as in Example 1a, except that a compound (a polydimethylsiloxane-based compound, PDMS) of Formula 10 and monofunctional fluoromethacrylate were used instead of monofunctional fluoromethacrylate, and a molar mixing ratio of POEM, the compound (a polydimethylsiloxane-based compound, PDMS) of Formula 10, and monofunctional fluoromethacrylate was 2:2:1.

Formula 10

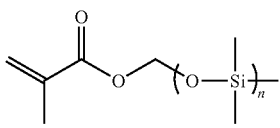

In Formula 10, n is 50,

Formula 11

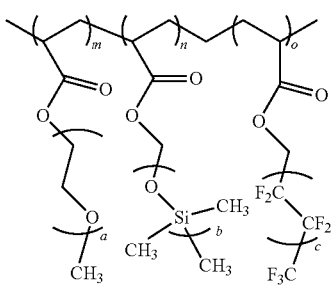

In Formula 11, m is 0.4, n is 0.4, o is 0.2, a is 10, b is 50, and c is 8.

The copolymer of formula 11 had a weight average molecular weight of about 80,000, a degree of polymerization of about 180, and a polydispersity)PDI) of about 1.3

Example 6

Preparation of Polymer Electrolyte

A polymer electrolyte including a copolymer represented by Formula 5a was prepared at a thickness of about 20 μm in the same manner as in Example 5, except that glycerol carbonate methacrylate was used instead of monofunctional fluoromethacrylate, and a mixing ratio of POEM, the compound (a polydimethylsiloxane-based compound, PDMS) of Formula 10, and glycerol carbonate methacrylate was changed to 2:2:1 at a molar ratio.

Formula 5a

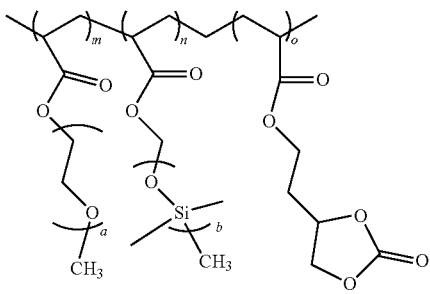

In Formula 5a, a is 10, b is 50, m is 0.4, n is 0.4, and o is 0.2. The copolymer represented by Formula 5a had a degree of polymerization of about 200 and a weight average molecular weight of about 80,000.

Comparative Example 1

Preparation of Polymer Electrolyte

Ethylene glycol methyl ether methacrylate and a photoinitiator (Darocur® 1173, available from BASF) were mixed, and a LiTFSI solution having a concentration of about 15 percent by weight (wt %) prepared by dissolving a lithium salt (LiTFSI) in THF was added to the mixture to prepare a polymer electrolyte composition. An amount of the photoinitiator was 5 parts by weight based on 100 parts by weight of ethylene glycol methyl ether methacrylate.

The polymer electrolyte composition was cast on a support substrate, followed by UV irradiation under $N_2$ atmosphere to thereby obtain a polymer electrolyte having a thickness of 670 μm including POEM.

Comparative Example 2a

Preparation of Polymer Electrolyte

The compound of Formula 10 (a polydimethylsiloxane-based compound, PDMS), ethylene glycol methyl ether methacrylate, and a photoinitiator (Darocur® 1173, available from BASF) were mixed, and a LiTFSI solution having a concentration of about 15 wt % prepared by dissolving a lithium salt (LiTFSI) in THF was added to the mixture to prepare a polymer electrolyte composition. An amount of the photoinitiator was 5 parts by weight based on 100 parts by weight of (ethylene glycol) methyl ether methacrylate.

Formula 10

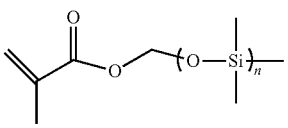

In Formula 10, n is 50.

The polymer electrolyte composition was cast on a support substrate, followed by UV irradiation under $N_2$ atmosphere to thereby obtain a polymer electrolyte having a thickness of 30 μm including POEM and PDMS.

Comparative Example 2b

Preparation of Polymer Electrolyte

A polymer electrolyte was prepared in the same manner as in Comparative Example 2a, except that succinonitrile (SN) was added during preparation of a polymer electrolyte composition. An amount of succinonitrile was about 20 parts by weight based on 100 parts by weight of the total weight of the polymer electrolyte composition.

Example 7

Manufacture of Lithium Metal Battery

Lithium metal battery was manufactured by disposing the polymer electrolytes of Example 1a between lithium metal thin films and SUS (stainless steel).

Examples 8 to 15

Manufacture of Lithium Metal Batteries

A lithium metal batteries were manufactured in the same manner as in Example 7, except that the polymer electrolyte of Example 1b, the polymer electrolyte of Example 2a, the polymer electrolyte of Example 2b, the polymer electrolyte of Example 3a, the polymer electrolyte of Example 3b, and the polymer electrolytes of Examples 4 to 6 were each used instead of the polymer electrolyte of Example 1a.

Example 16

Manufacture of Lithium Metal Battery (Full Cell)

$LiNi_{0.6}Co_{0.2}Al_{0.2}O_2$, a conducting agent (Super-P, available from Timcal Ltd.), a binder, and N-methylpyrrolidone were mixed to prepare a positive electrode composition. A polymer electrolyte prepared by Example 1 was used as the binder. A mixing weight ratio of $LiNi_{0.6}Co_{0.2}Al_{0.2}O_2$, the conducting agent, and the binder in the positive electrode composition was 70:5:25.

The positive electrode composition was coated on a surface of an aluminum foil having a thickness of about 15 μm, dried at about 50° C., and further dried at about 60° C. in a vacuum to thereby manufacture a positive electrode.

A lithium metal battery (coin cell) was assembled with the polymer electrolyte of Example 1a between the manufactured positive electrode and a lithium metal negative electrode having a thickness of about 20 μm.

Example 17

Manufacture of Lithium Metal Battery (Full Cell)

A lithium metal battery (full cell) was manufactured in the same manner as in Example 16, except that the polymer electrolyte of Example 3a was used instead of the polymer electrolyte of Example 1a.

Example 18

Manufacture of Lithium Air Battery

An 1-ethyl-3-methylimidazolium bis(trifluoromethylsulfonyl)imide (EMI-TFSI) ionic liquid containing 0.5 molar (M) of lithium bis(trifluoromethylsulfonyl)imide (LiTFSI), porous carbon nanotubes, and polytetrafluoroethylene (PTFE) were mixed at a weight ratio of 5:10:1 to prepare a positive electrode in the form of a sheet. The positive electrode in the form of a sheet was cut, and thus a positive electrode in the form of a disc having a diameter of 12 millimeters (mm) was obtained.

The polymer electrolyte prepared in Example 1a was coated on lithium, and a lithium disc having a thickness of about 30 μm and a diameter of about 15 mm was used as a negative electrode.

A copper foil, a lithium metal disc, a polymer electrolyte, a mask, a positive electrode, and a gas diffusion layer (SGL 35BA) were assembled to prepare a lithium air battery having a structure shown in FIG. 7A.

The mask was a porous layer having a thickness in a range of about 5 μm to about 15 μm and formed of polyethylene or polypropylene.

Examples 19 to 22

Manufacture of Lithium Metal Batteries (Coin Cell)

Lithium metal batteries were manufactured in the same manner as in Example 7, except that the polymer electrolyte of Example 1c, the polymer electrolyte of Example 3d, the polymer electrolyte of Example 3e, and the polymer electrolyte of Example 3f were each used instead of the polymer electrolyte of Example 1a.

Comparative Examples 3 to 5

Manufacture of Lithium Metal Batteries (Coin Cell)

Lithium metal batteries were manufactured in the same manner as in Example 7, except that the polymer electrolytes of Comparative Examples 1, 2a, and 2b were each used instead of the polymer electrolyte of Example 1a.

Evaluation Example 1

Linear Sweep Voltammetry (LSV)

The lithium metal batteries were analyzed by linear sweep voltammetry (LSV) to evaluate electrochemical stability.

The analysis conditions by LSV were as follows:
Voltage range: about 3 volts (V) to 7 V
Scan Rate: about 0.1 millivolts per second (mV/s)
Temperature: about 25° C.

Figure 3:
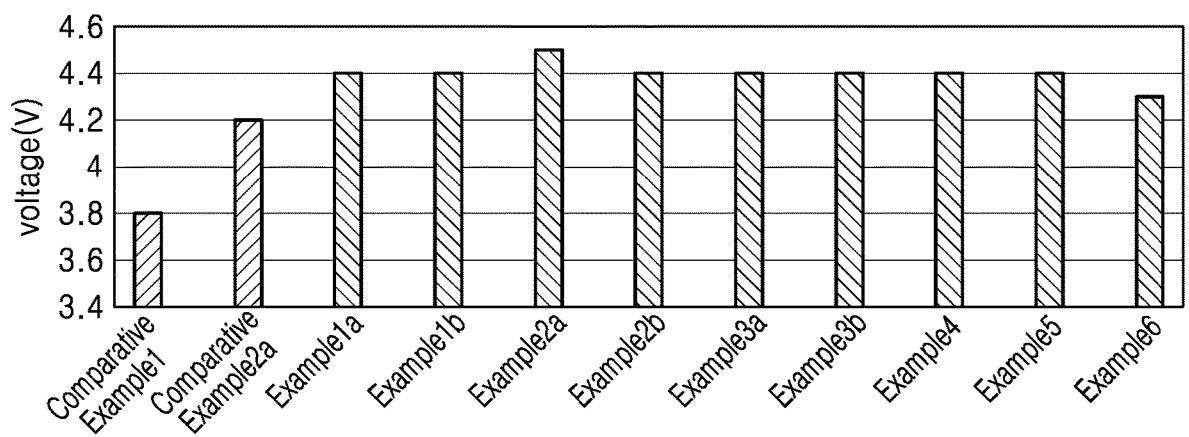
FIG. 3 is a diagram illustrating the results of linear sweep voltametry (LSV) (voltage, volts) in lithium metal batteries prepared in Examples manufactured by Examples 7 through 15 and Comparative Examples 3 and 4 using the polymer electrolytes of Examples 1a, 1b, 2a, 2b, 3a, 3b, 4 to 6 and Comparative Examples 1 and 2a, respectively.

The lithium metal batteries manufactured by Examples 7 through 15 and Comparative Examples 3 and 4 using the polymer electrolytes of Examples 1a, 1b, 2a, 2b, 3a, 3b, 4 to 6 and Comparative Examples 1 and 2a, respectively were analyzed by LSV to evaluate electrochemical stability, and the results of the LSV performed to evaluate the electrochemical stability of each of the lithium metal batteries are shown in Table 1 and FIG. 3.

TABLE 1

| Example | LSV(V) |
|---|---|
| Example 7 (Example 1a) | 4.4 |
| Example 8 (Example 1b) | 4.4 |
| Example 9 (Example 2) | 4.5 |
| Example 10 (Example 3a) | 4.4 |
| Example 11 (Example 3b) | 4.3 |
| Example 12 (Example 3c) | 4.3 |
| Example 13 (Example 4) | 4.3 |
| Example 14 (Example 5) | 4.4 |
| Example 15 (Example 6) | 4.3 |
| Comparative Example 3 (Comparative Example 1) | 3.8 |
| Comparative Example 4 (Comparative Example 2a) | 4.2 |

Referring to Table 1 and FIG. 3, an oxidation potential range of the lithium metal batteries prepared in Examples 7 to 15 was found to be from about 4.3 V to about 4.5 V, and an oxidation potential range of the lithium metal batteries prepared in Comparative Examples 3 and 4 was found to be from about 3.8 V to about 4.2 V. Thus, it may be known that the lithium metal batteries of Examples 7 to 15 had oxidation potential values higher than those of the lithium metal batteries of Comparative Examples 3 and 4.

Also, current densities change according to a voltage of the lithium metal batteries including the polymer electrolytes of Examples 1a, 2, and 3a and Comparative Examples 1 and 2a were evaluated. The results are shown in FIG. 9.

Figure 9:
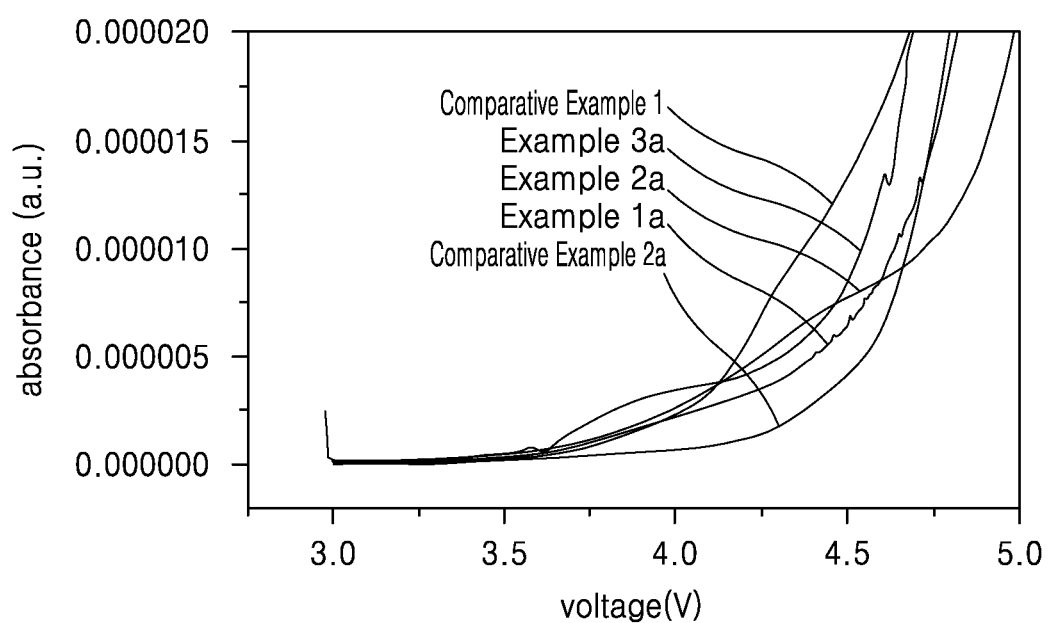

Referring to FIG. 9, the lithium metal batteries including the polymer electrolytes of Example 1a, 2, and 3a were found to have improved current density characteristics compared to those of the lithium battery including the polymer electrolytes of Comparative Example 1. Also, the polymer electrolytes of Example 1a, 2a, and 3a were found to be stable at a fluorine-based or carbonate-based functional group substituted POEM-based oxidation-reduction potential of 4.4 V or higher compared to that (3.8 V) of POEM of Comparative Example 1, and thus the polymer electrolytes of Example 1a, 2a, and 3a may be used as a high-voltage type (NCA or NCM) battery material.

Evaluation Example 2

Ion Conductivity

Ion conductivities of the polymer electrolytes prepared in Examples 1a, 1b, 2a, 2b, 3a, 3b, and 4 to 6 and Comparative Examples 1 and 2a were evaluated at a temperature of 60° C.

The ion conductivities of the polymer electrolytes were measured using an alternating impedance method as follows. The resistances of the polymer electrolytes were measured by scanning in a frequency range of about 0.1 hertz (Hz) to 1 megahertz (MHz) with a voltage bias of about 10 millivolts (mV), to thereby evaluate ion conductivities of the polymer electrolytes. The results are shown in FIG. 4.

Figure 4:
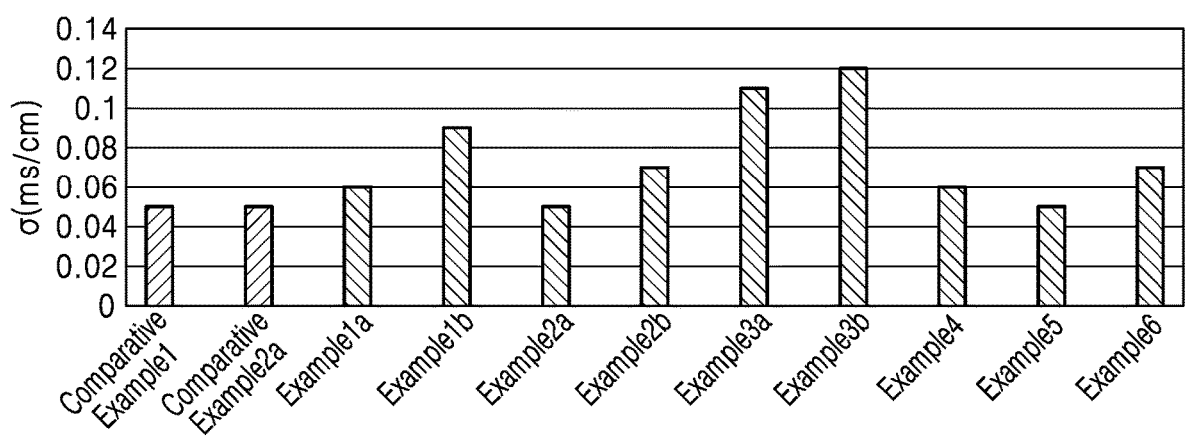

Referring to FIG. 4, the polymer electrolytes of Examples 1a, 1b, 2a, 2b, 3a, 3b, and 4 to 6 were found to have improved ion conductivities, compared to those of the polymer electrolytes of Comparative Examples 1 and 2a.

Evaluation Example 3

Lifespan

Li/Li symmetric cells were prepared by using a lithium metal having a thickness of about 40 μm as a positive electrode and a negative electrode and each of the polymer electrolytes of Examples 1a, 1b, and 3a to 3c and Comparative Examples 1 and 2 as a separator.

Figure 5A:
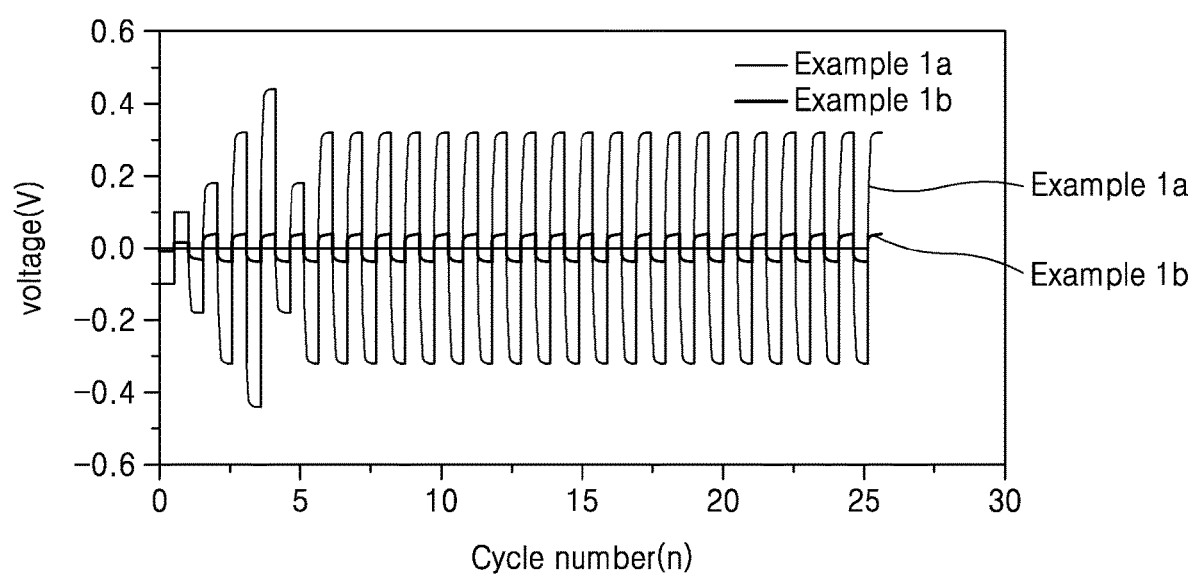
FIG. 5A is a graph illustrating lifespan characteristics of Li/Li symmetric cells using the polymer electrolytes prepared in Examples 1a and 1b.
Figure 5B:
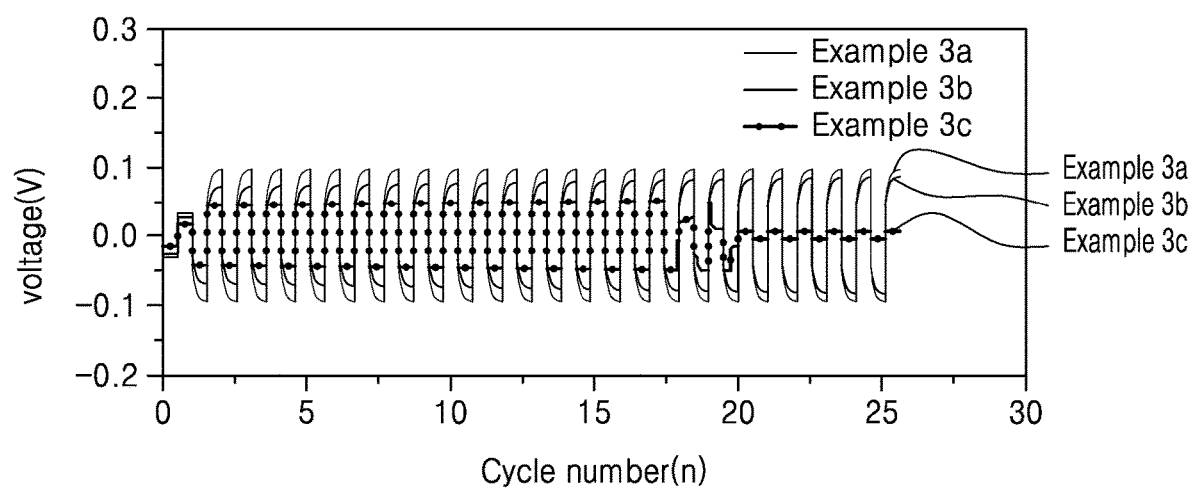
FIG. 5B is a graph illustrating lifespan characteristics of Li/Li symmetric cells using the polymer electrolytes prepared in Examples 3a to 3c.
Figure 5C:
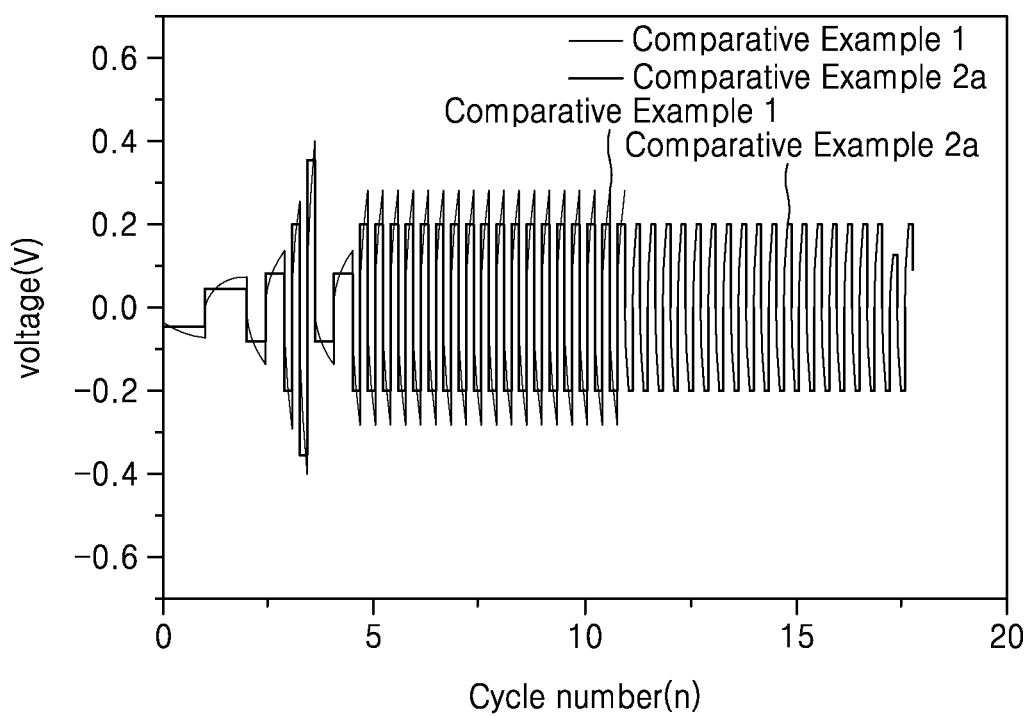

The cells were charged and discharged with a constant current of 0.1 C, 0.2 C, 0.5 C, and 1 C rate based on 0.5 milliampere hours per square centimeter (mAh/cm$^2$) of a capacity per area to measure charging/discharging lifespan with a constant current of 0.5 C, and the results are shown in FIGS. 5A to 5C. FIG. 5A is a graph illustrating lifespan characteristics of Li/Li symmetric cells using the polymer electrolytes prepared in Examples 1a and 1b, and FIG. 5B is a graph illustrating lifespan characteristics of Li/Li symmetric cells using the polymer electrolytes prepared in Examples 3a to 3c.

FIG. 5C is a graph illustrating lifespan characteristics of Li/Li symmetric cells using the polymer electrolytes prepared in Comparative Examples 1 and 2a.

Referring to FIGS. 5A to 5C, the Li/Li symmetric cells using the polymer electrolytes prepared in Examples 1a, 1b, and 3a to 3c were found to have improved lifespan characteristics compared to those of the Li/Li symmetric cells using the polymer electrolytes of Comparative Examples 1 and 2.

Evaluation Example 4

Overvoltage

Li/Li symmetric cells were prepared by using a lithium metal having a thickness of about 40 μm as a positive electrode and a negative electrode and each of the polymer electrolytes of Examples 1c, 3d, 3e, and 3f and Comparative Examples 1, 2a, and 2b as a separator.

In the charging/discharging graph of each of the Li/Li symmetric cells, overvoltage was evaluated under conditions of measuring a charge flat voltage and a discharge flat voltage.

The results of evaluating the overvoltage are shown in Table 2.

TABLE 2

| Example | Mixing molar ratio of repeating unit in Copolymer (m:n) | Additive | Overvoltage (mV) (0.25 mA/cm$^2$) |
| --- | --- | --- | --- |
| Comparative Example | — | | 300 |
| Comparative Example 2a | 7:3 | — | 200 |
| Comparative Example 2b | | SN | 200 |
| Example 1c | 2:1 | SN | 40 |
| Example 3d | 1:1 | SN | 50 |
| Example 3e | 3:1 | SN | 90 |
| Example 3f | 4:1 | SN | 70 |

As shown in Table 2, the Li/Li symmetric cells using the polymer electrolytes of Examples 1c and 3d to 3f were found to have an overvoltage of 100 mV or lower, which was lower than those of the Li/Li symmetric cells using the polymer electrolytes of Comparative Examples 1, 2a, and 2b.

Evaluation Example 5

Charging/Discharging Characteristics

1) Example 16

The lithium metal battery (full cell) prepared in Example 16 was charged at a high temperature (about 60° C.) with a constant current of 0.1 C rate at a voltage of about 3.0 V to 4.2 V with respect to lithium metal, and then discharged with a constant current of 0.1 C to a cutoff voltage of about 4.2 V.

This cycle of charging and discharging was repeated 20 times.

Separately, the same charging and discharging process was repeated 20 times, except that the charging and discharging time was changed to 0.2C instead of 0.1C in the charging and discharging process described above.

Figure 6A:
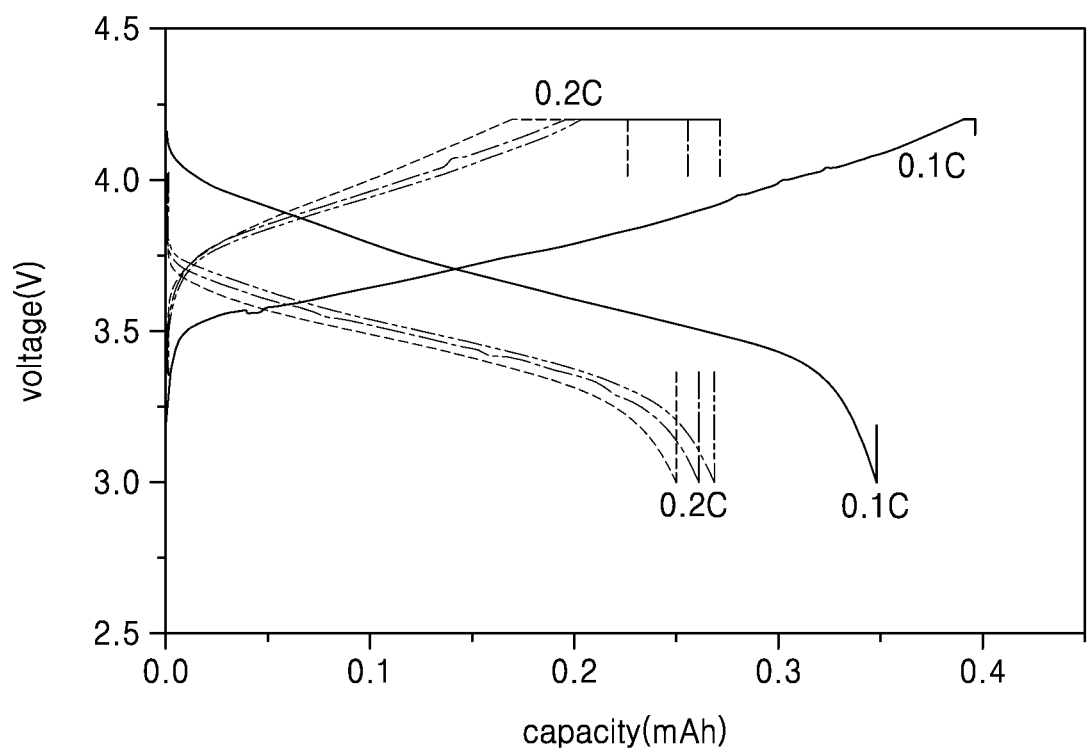
FIG. 6A is a graph of voltage (volts, V) with respect to capacity (milliampere hours, mAh) of a lithium metal battery (a full cell) prepared in Example 16.
Figure 6B:
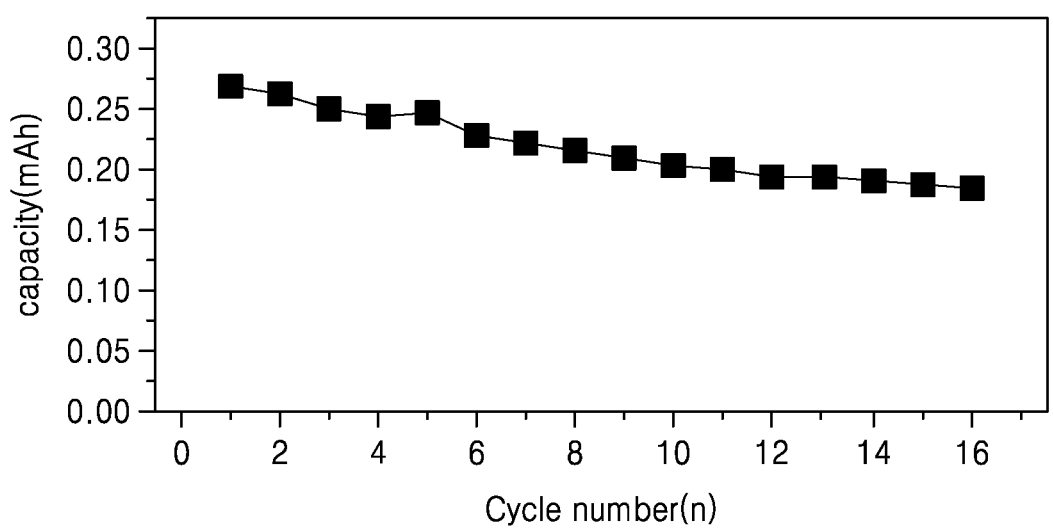
FIG. 6B is a graph of capacity (milliampere hours, mAh) with respect to a number of cycles (n) of the lithium metal battery (a full cell) prepared in Example 16.

Change in voltage with respect to capacity is shown in FIG. 6A, and change in capacity with respect to the number of cycles is shown in FIG. 6B.

Referring to FIGS. 6A and 6B, 4.2 V charging/discharging behavior of the lithium metal battery of Example 16 would have been confirmed.

2) Example 17

The lithium metal battery of Example 17 was evaluated by using the same charging/discharging characteristics evaluation method used for the lithium metal battery of Example 16.

Figure 6C:
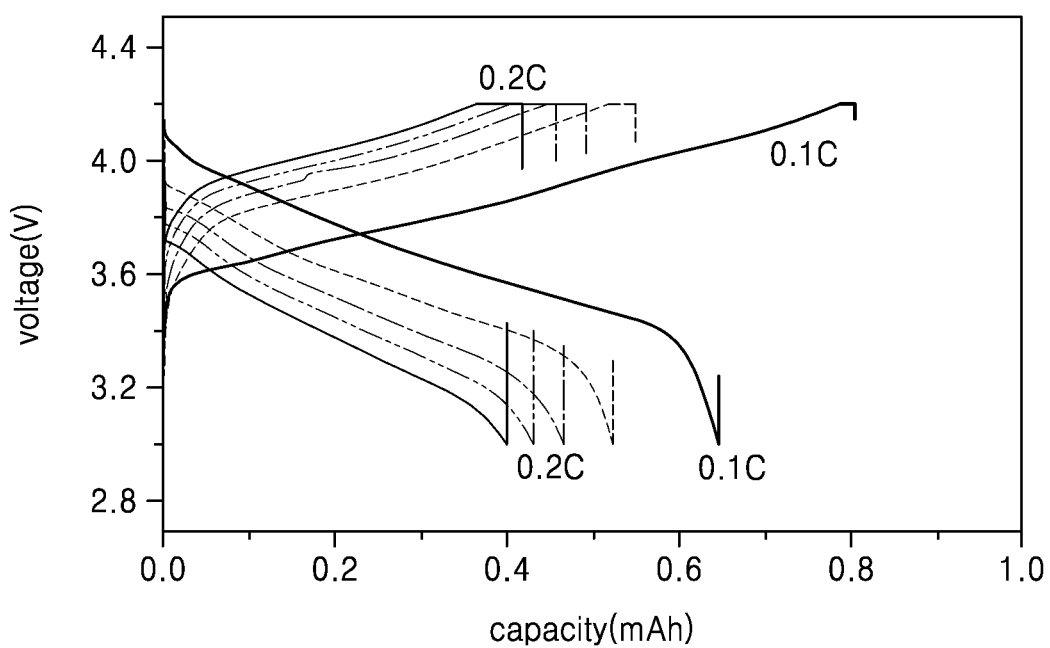
FIG. 6C is a graph of voltage (volts, v) with respect to capacity of a lithium metal battery (a full cell) (milliampere hours, mAh) prepared in Example 17.
Figure 6D:
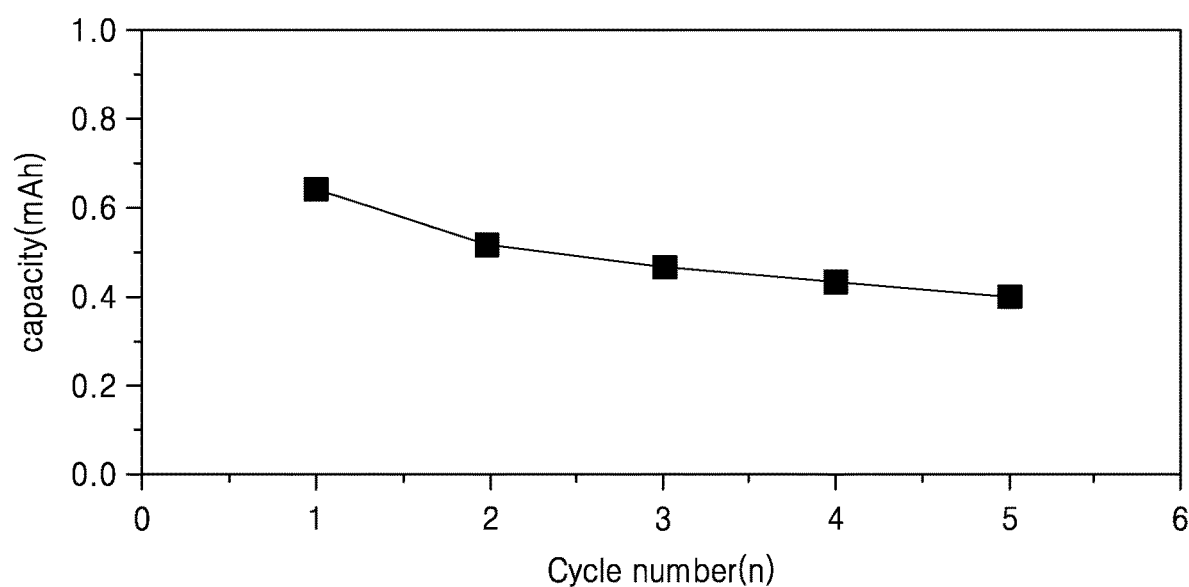
FIG. 6D is a graph of capacity (milliampere hours, mAh) with respect to a number of cycles (n) of the lithium metal battery (a full cell) prepared in Example 17.

Change in voltage with respect to capacity is shown in FIG. 6C, and change in capacity with respect to the number of cycles is shown in FIG. 6D.

Referring to FIGS. 6C and 6D, the lithium metal battery of Example 17 was found to exhibit the same 4.2 V charging/discharging behavior exhibited by the lithium metal battery of Example 16.

Evaluation Example 6

Charging/Discharging Characteristics

The lithium air battery of Example 18 was placed in a chamber, in which a temperature was about 80° C., and an oxygen atmosphere was maintained. The cell was discharged until a voltage of 1.8 V with a constant current (CC) mode of 0.24 mA/cm$^2$ at 1 atmosphere (atm), and then charged with a CC mode of 0.24 mA/cm$^2$ and a constant voltage (CV) mode of 4.3 V.

Figure 7B:
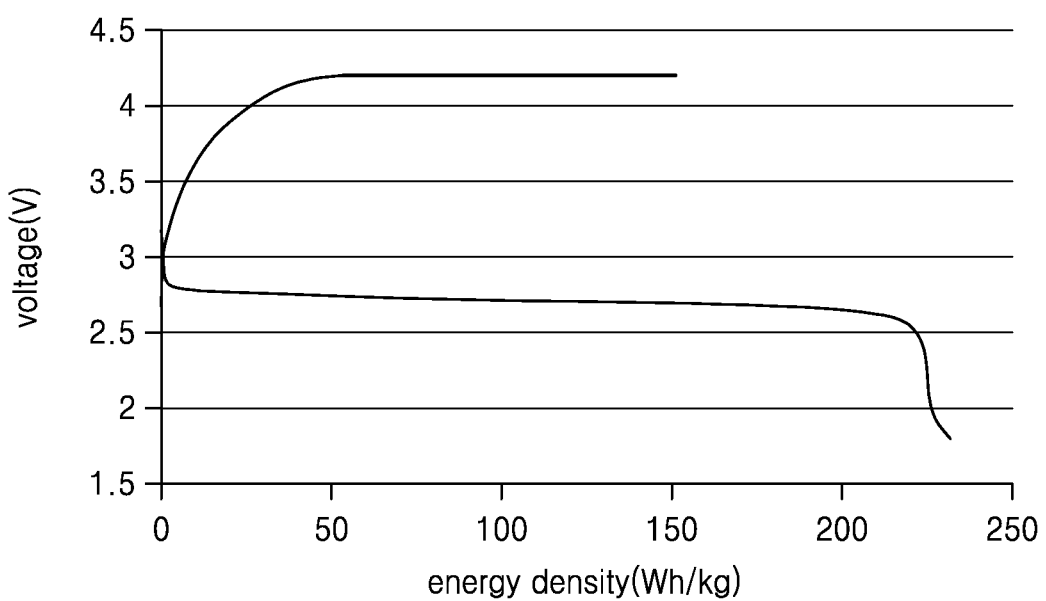
FIG. 7B is a graph of voltage (volts, v) with respect to energy density (watt hours per kilograms, Wh/kg) of a lithium air battery prepared in Example 18.

Regarding the lithium air battery, change in voltage with respect to energy density was evaluated, and the results are shown in FIG. 7B.

Referring to FIG. 7B, it may be known that the lithium air battery of Example 18 may secure an initial energy density of 230 Wh/kg.

Evaluation Example 7

Infrared Ray (IR) Analysis

IR analysis was performed on the copolymers prepared in Examples 1a, 2a, and 3a and Comparative Examples 1 and 2a. The IR analysis was performed by using FTS-6000 available from Bruker, and the results of the IR analysis are shown in FIG. 8A.

Figure 8A:
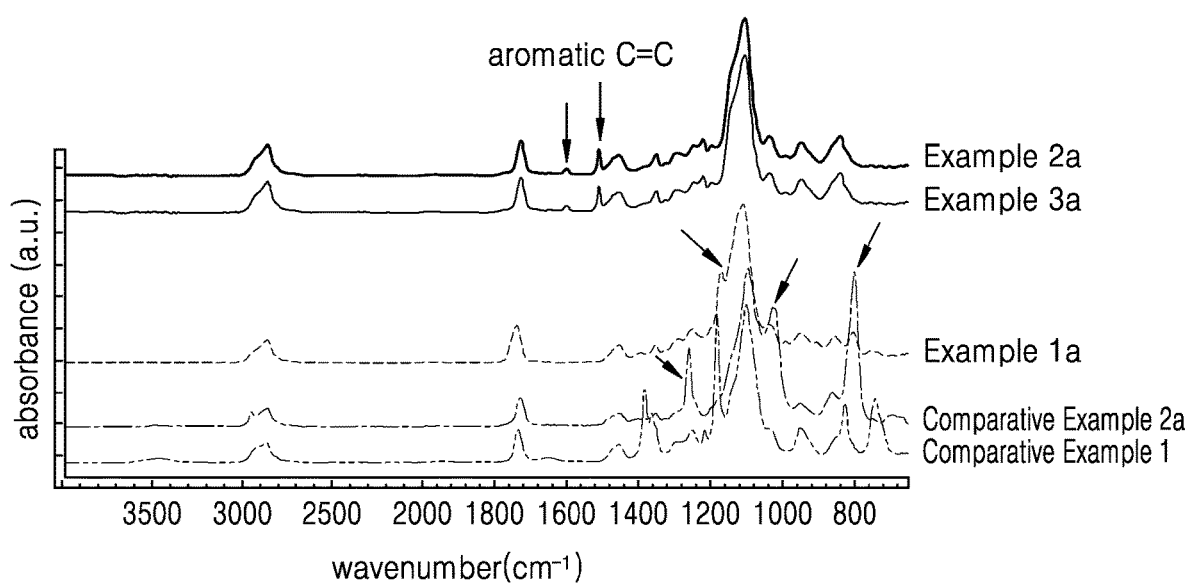

Referring to FIG. 8A, the copolymer of Comparative Example 1 was not found to have a —C=C— peak but was found to have a peak similar to a polyethylene glycol structure. Also, the copolymer of Comparative Example 2 was found to have a PDMS band (arrow). Also, the copolymer of Example 1a was found to have a C—F related peak (arrow). In this regard, characteristics of a fluorine-based and carbonate functional group in the copolymers of Examples 1a, 2a, and 3a were confirmed by the IR analysis.

Evaluation Example 8

Nuclear Magnetic Resonance (NMR) Analysis $^1$H-NMR spectrum of each of the polymer electrolytes prepared in Examples 1a, 2a, and 3a and Comparative Examples 1 and 2a was analyzed. Sample for the analysis were prepared by dissolving 10 milligrams (mg) of each of the polymer electrolytes in 0.75 milliliters (ml) of acetone-DMSO. The $^1$H-NMR analysis was performed by using NMR 600 MHz (AVANCE III) available from Bruker. The results of the analysis are shown in FIG. 8B.

Figure 8B:
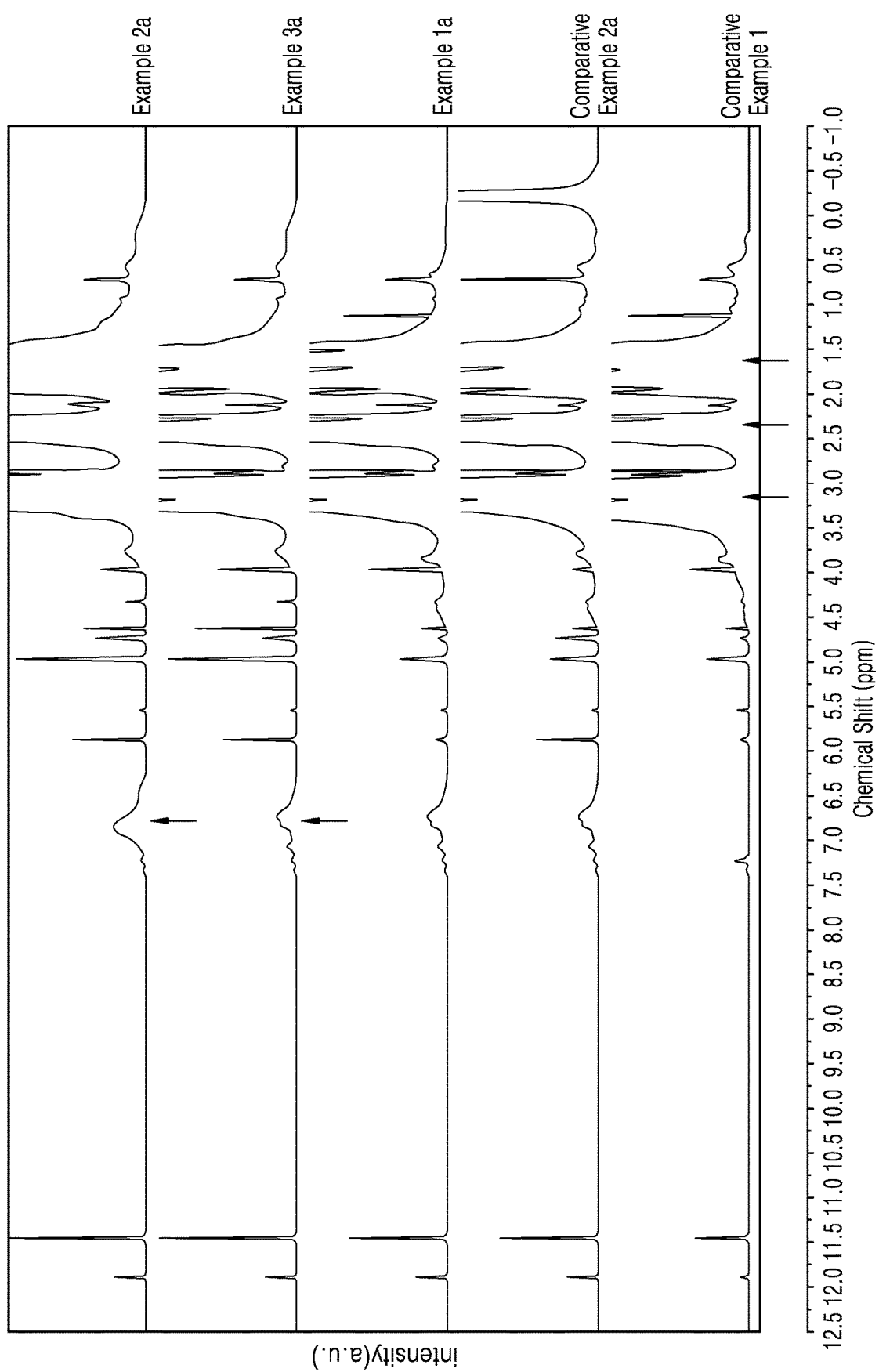

Referring to FIG. 8B, the copolymer of Comparative Example 1 was found to have the largest peak indicated by an arrow. Also, the copolymer of Comparative Example 2a had a broad Si—CH$_3$ peak indicated by an arrow. Also, the copolymers of Examples 1a, 2a, and 3a had an aromatic cyclic peak indicated by an arrow.

Evaluation Example 9

Thermogravimetric Analysis

Thermogravimetric analysis was performed on the polymer electrolytes prepared in Examples 1a, 2a, 3a, and 4 and Comparative Example 1.

The thermogravimetric analysis was performed by using TA (SDT: TGA+DSC) 2010 TGA/DSC1 (available from METTLER TOLEDO) at a temperature range from room temperature to 1600° C. Referring to the result of the thermogravimetric analysis, the polymer electrolytes of Examples 1a, 2a, 3a, and 4 were found to have improved high-temperature stability compared to that of the polymer electrolyte of Comparative Example 1. Therefore, the polymer electrolytes of Examples 1a, 2a, 3a, and 4 may be used in a high-voltage type lithium metal battery.

Evaluation Example 10

Differential Scanning Calorimeter (DSC) Analysis

Differential scanning calorimeter (DSC) analysis was performed on the polymer electrolytes prepared in Examples 1a, 2a, 3a, and 4, Comparative Examples 1 and 2a. The DSC analysis was performed by using Universal V4.5A TA Q2000 (available from TA Instruments).

According to the results of the DSC analysis, a glass transition temperature of the polymer electrolyte of Comparative Example 1 was −58° C. In comparison, glass transition temperatures of the polymer electrolytes of Examples 1a, 2a, 3a, and 4 were within a range of about −70° C. to about −60° C. In this regard, since the polymer electrolytes of Examples 1a, 2a, 3a, and 4 had low glass transition temperatures, ion conductivity may improve when the polymer electrolytes of Examples 1a, 2a, 3a, and 4 are used.

Evaluation Example 11

Lithium Transference Number

Lithium symmetric cells were manufactured with the polymer electrolytes of Examples 1a, 2, 3a, and 4 and Comparative Examples 1 and 2a, each placed between lithium metal thin films. Lithium transference numbers ($t_{Li}$) of the lithium symmetric cells at about 60° C. were evaluated. Some of the results are shown in Table 3 and FIG. 10.

The lithium transference numbers were calculated using Equation 1, and the results are shown in Table 3. A current decay with time with respect to impedance and input voltage of a lithium symmetric cell or a SUS symmetric cell were measured and used to calculate the lithium ion transference number.

$$t_{Li^+} = \frac{i_{ss}(\Delta V - i_0 R^0)}{i_0(\Delta V - i_{ss} R^{ss})} \quad \text{Equation 1}$$

In Equation 1,
ΔV denotes a voltage change,
$i_o$) indicates an initial current,
$i_{ss}$ indicates a steady state current,
$R^0$ indicates an initial resistance, and
$R^{ss}$ indicates a steady state resistance.

TABLE 3

| Example | $t_{Li+}$ |
|---|---|
| Example 1a | 0.37 |
| Example 2a | 0.35 |
| Example 3a | 0.29 |
| Example 4 | 0.22 |
| Comparative Example 1 | 0.17 |
| Comparative Example 2a | 0.21 |

Figure 10:
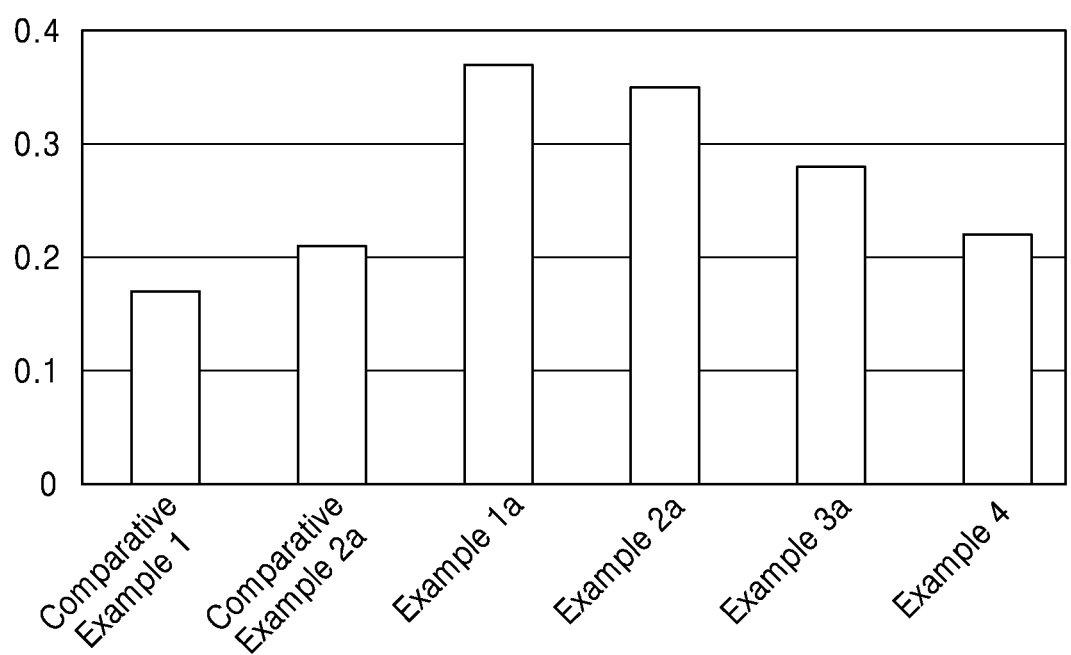

Referring to Table 3 and FIG. 10, the polymer electrolytes of Examples 1a, 2a, 3a, and 4 were found to have a higher lithium transference number, compared to those of Comparative Examples 1 and 2, indicating that the polymer electrolytes of Examples 1a, 2a, 3a, and 4 may improve a lithium ion transfer function.

Evaluation Example 12

Lithium Deposition Density

Each of the lithium metal batteries of Examples 7, 11, and 13 using the polymer electrolytes of Examples 1a, 3a, and 4 and the lithium metal batteries of Comparative Examples 3 and 4 using the polymer electrolytes of Comparative Examples 1 and 2a were charged with a constant current of 0.1 C rate (0.38 milliamperes per square centimeter, mA/cm$^2$) at about 25° C. to a voltage of about 4.40 V (with respect to Li) and maintained at a constant voltage of about 4.40 V (constant voltage mode) to a cutoff current of 0.05 C rate. A lithium deposition density of each of the lithium metal batteries and a thickness deviation were also measured. The results are shown in Table 4.

TABLE 4

| Example | Lithium deposition density (g/cc) |
|---|---|
| Example 7 | 0.25 |
| Example 11 | 0.22 |
| Example 13 | 0.23 |
| Comparative Example 3 | 0.20 |
| Comparative Example 4 | 0.22 |

Referring to Table 4, the lithium metal batteries of Examples 7, 11, and 13 were found to have excellent lithium deposition density.

As described above, according to one or more embodiments, a polymer electrolyte may have improved oxidation stability, ion conductivity, and high-voltage stability. A lithium metal battery with improved capacity retention rate and capacity characteristics may be manufactured by using the polymer electrolyte.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the present disclosure as defined by the following claims.

What is claimed is:

1. A polymer electrolyte comprising a copolymer, the copolymer comprising
at least one first repeating unit represented by Formula 1;

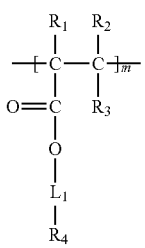

Formula 1 wherein, in Formula 1,
$R_1$ to $R_3$ are each independently hydrogen, a substituted or unsubstituted C1-C30 alkyl group, a substituted or unsubstituted C1-C30 alkoxy group, a substituted or unsubstituted C2-C30 alkenyl group, a substituted or unsubstituted C2-C30 alkynyl group, a substituted or unsubstituted C6-C30 aryl group, a substituted or unsubstituted C6-C30 aryloxy group, a substituted or unsubstituted C7-C30 arylalkyl group, a substituted or unsubstituted C2-C30 heteroaryl group, a substituted or unsubstituted C2-C30 heteroaryloxy group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, or a substituted or unsubstituted C2-C30 heterocyclicalkyl group, $R_4$ is hydrogen, a substituted or unsubstituted C1-C30 alkyl group, a substituted or unsubstituted C2-C30 alkenyl group, a substituted or unsubstituted C2-C30 alkynyl group, a substituted or unsubstituted C6-C30 aryl group, a substituted or unsubstituted C7-C30 arylalkyl group, a substituted or unsubstituted C2-C30 heteroaryl group, a substituted or unsubstituted C3-C30 heteroarylalkyl group, a substituted or unsubstituted C4-C30 carbocyclic group, a substituted or unsubstituted C5-C30 carbocyclicalkyl group, a substituted or unsubstituted C2-C30 heterocyclic group, —Si(R)(R')(R"), or a substituted or unsubstituted C2-C30 heterocyclicalkyl group, R, R', and R" are each independently hydrogen or a C1-C10 alkyl group, $L_1$ is an ion-conductive unit selected from a C1-C30 alkylene oxide group, —{Si(R)(R)—O-}$_b$-, —(CH$_2$CH$_2$O)$_a$—{Si(R)(R)—O-}$_b$-, or —(CH$_2$)$_a$—(Si(R)(R')—O—)$_b$, R, R', and R" are each independently hydrogen or a C1-C10 alkyl group, a is an integer from 1 to 20,
b is an integer from 1 to 60,
0<m<1, and
a crosslink unit of

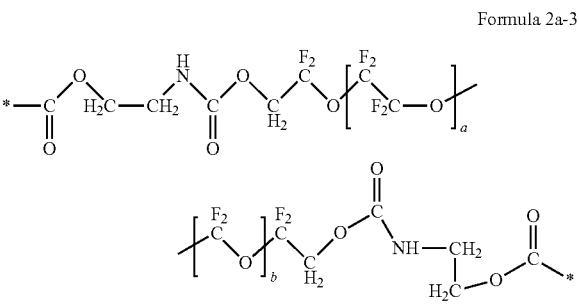

Formula 2a-3 wherein, in Formula 2a-3, a and b are each independently an integer from 1 to 20, and * denotes a binding site to a neighboring atom; or a copolymer represented by one of Formulae 3 to 6;

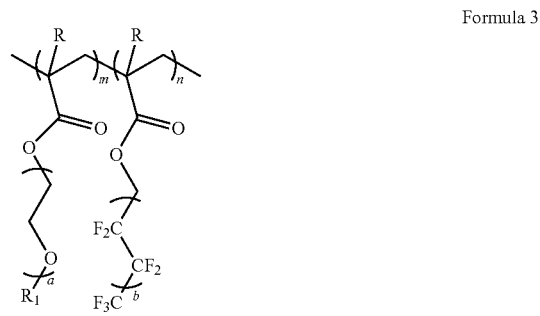

Formula 3 wherein, in Formula 3,

R and $R_1$ are each independently hydrogen or a C1-C5 alkyl group, a and b are each independently an integer from 1 to 20, and m and n are each independently a number from 0.01 to 0.99, m+n=1, Formula 4 wherein, in Formula 4,

R and $R_1$ are each independently hydrogen or a C1-C5 alkyl group, a is an integer from 1 to 20, and m and n are each independently a number from 0.01 to 0.99, m+n=1, Formula 5 wherein, in Formula 5,

R and $R_1$ are each independently hydrogen or a C1-C5 alkyl group, a is an integer from 1 to 20, b is an integer from 1 to 60, m, n, and o are each independently a number from 0.01 to 0.99, m+n+o=1, and Formula 6 wherein, in Formula 6,

R and $R_1$ are each independently hydrogen or a C1-C5 alkyl group, a and c are each independently an integer from 1 to 20, b is an integer from 1 to 60, and m, n, and l are each independently a number from 0.01 to 0.99, m+n+l=1.

2. The polymer electrolyte of claim 1, wherein, in Formula 1, —C(=O)—O-$L_1$-$R_4$ is a group represented by Formulae 1a or 1b:

Formula 1a

Formula 1b wherein, in Formulae 1a or 1b, $R_4$ is the same as in Formula 1, each a is an integer from 1 to 12, b is an integer from 1 to 59, and

* denotes a binding site to a neighboring atom.

3. The polymer electrolyte of claim 1, wherein in the copolymer represented by Formulae 3 to 6 a mole ratio of m:n is about 1:1 to about 5:1.

4. The polymer electrolyte of claim 1, wherein, in Formula 5, an amount of the repeating unit denoted by m is about 0.4 mol to about 0.9 mol, an amount of the repeating unit denoted by n is about 0.05 to about 0.3 mol, and an amount of the repeating unit denoted by o is about 0.05 mol to about 0.3 mol based on 1 mol of the total amount of the repeating unit denoted by m, the repeating unit denoted by n, and the repeating unit denoted by o; and wherein, in Formula 6, an amount of the repeating unit denoted by m is about 0.4 mol to about 0.9 mol, an amount of the repeating unit denoted by n is about 0.05 to about 0.3 mol, and an amount of the repeating unit denoted by l is about 0.05 mol to about 0.3 mol based on 1 mol of the total amount of the repeating unit denoted by m, the repeating unit denoted by n, and the repeating unit denoted by l.

5. The polymer electrolyte of claim 1, wherein, in Formulae 3 to 5, $R_1$ is each independently a C1-C5 alkyl group, and wherein in Formula 6, $R_4$ is a C1-C5 alkyl group.

6. The polymer electrolyte of claim 1, wherein, in the copolymer of Formulae 3 to 5, a mole ratio of m:n is 1:1, 2:1, 3:1, 4:1, or 5:1.

7. The polymer electrolyte of claim 1, wherein ion conductivity of the copolymer is about 0.01 millisiemens per centimeter or greater, and a Young's modulus of the copolymer is about 100,000 megapascals or greater.

8. The polymer electrolyte of claim 1, wherein the polymer electrolyte further comprises a lithium salt in an amount of about 20 parts to about 100 parts by weight based on 100 parts by weight of the copolymer.

9. The polymer electrolyte of claim 8, wherein the lithium salt is at least one selected from LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiSbF$_6$, Li(FSO$_2$)$_2$N, LiC$_4$F$_9$SO$_3$, LiN(SO$_2$CF$_2$CF$_3$)$_2$, LiPF$_3$(C$_2$F$_5$)$_3$, LiPF$_3$(CF$_3$)$_3$, LiCl, LiF, LiBr, LiI, lithium difluoro(oxalato)borate, and lithium bis(oxalato) borate.

10. The polymer electrolyte of claim 1, wherein the copolymer is at least one selected from a copolymer represented by Formula 3a, a copolymer represented by Formula 11, a copolymer represented by Formula 4a, and a copolymer represented by Formula 5a:

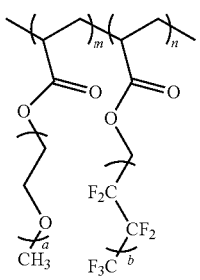

Formula 3a wherein, in Formula 3a,
a is 10, b is 8, and
m and n are each independently a number from 0.01 to 0.99, provided that the sum of m and n is 1,

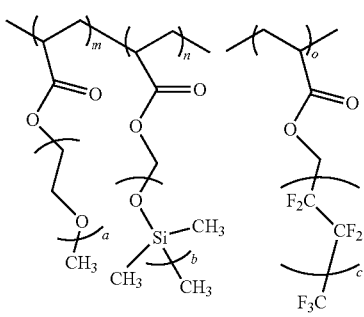

Formula 11 wherein, in Formula 11,
m, n, and o are each independently a number from 0.01 to 0.99, provided that the sum of m, n, and o is 1,
a is 10,
b is 50, and
c is 8,

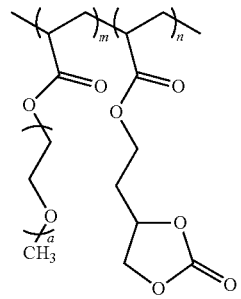

Formula 4a wherein, in Formula 4a,
a is 10, and
m and n are each independently a number from 0.01 to 0.99, provided that the sum of m and n is 1,

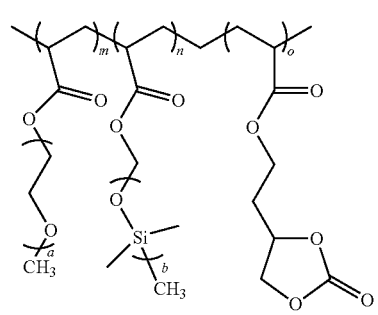

Formula 5a wherein, in Formula 5a,
a is 10,
b is 50, and
m, n, and o are each independently a number from 0.01 to 0.99, provided that the sum of m, n, and o is 1.

11. The polymer electrolyte of claim 1, wherein a glass transition temperature of the copolymer is about −70° C. to about 25° C.

12. The polymer electrolyte of claim 1, wherein a weight average molecular weight of the copolymer is about 20,000 to about 500,000 Daltons.

13. The polymer electrolyte of claim 1, wherein an oxidation potential (vs. Li/Li$^+$) of the copolymer is about 4.3 volts or greater.

14. The polymer electrolyte of claim 1, wherein a lithium ion transference number of the copolymer is about 0.22 to about 0.4.

15. The polymer electrolyte of claim 1, wherein the polymer electrolyte further comprises at least one selected from an organic solvent, an ionic liquid, a polymer ionic liquid, and an inorganic particle.

16. The polymer electrolyte of claim 1, wherein an overvoltage of a lithium symmetrical cell comprising the polymer electrolyte is about 100 millivolts or lower during a charging/discharging process at a constant current of 0.25 milliamperes per square centimeter.

* * * * *